US011082390B2

(12) United States Patent
Ri'chard

(10) Patent No.: US 11,082,390 B2
(45) Date of Patent: Aug. 3, 2021

(54) METHODS AND DEVICES FOR FACILITATING AND MONETIZING MERGES OF TARGETS WITH STALKERS

(71) Applicant: Robert Ri'chard, Westchester, CA (US)

(72) Inventor: Robert Ri'chard, Westchester, CA (US)

(*) Notice: Subject to any disclaimer, the term of this patent is extended or adjusted under 35 U.S.C. 154(b) by 0 days.

(21) Appl. No.: 16/501,476

(22) Filed: Jun. 13, 2018

(65) Prior Publication Data

US 2020/0322303 A1 Oct. 8, 2020
US 2021/0203629 A9 Jul. 1, 2021

Related U.S. Application Data

(60) Provisional application No. 62/518,597, filed on Jun. 13, 2017.

(51) Int. Cl.
*H04L 12/58* (2006.01)
*G06Q 30/02* (2012.01)
*H04W 4/021* (2018.01)

(52) U.S. Cl.
CPC ......... *H04L 51/32* (2013.01); *G06Q 30/0208* (2013.01); *H04L 51/20* (2013.01); *H04W 4/021* (2013.01)

(58) Field of Classification Search
CPC ..... H04W 4/029; H04W 4/021; H04W 4/023; H04W 4/21; H04W 4/02; H04L 51/32; H04L 51/20; H04L 51/046; H04L 67/02; G06Q 30/0208

See application file for complete search history.

(56) References Cited

U.S. PATENT DOCUMENTS

| 9,769,612 | B1* | 9/2017 | Owen | G01S 19/13 |
| 2012/0069131 | A1 | 3/2012 | Abelow | |
| 2013/0081032 | A1 | 3/2013 | Levien | |
| 2014/0032371 | A1* | 1/2014 | Traina | G06Q 10/1095 |
| | | | | 705/26.81 |
| 2015/0373130 | A1 | 12/2015 | Hormigo Perez | |
| 2016/0066153 | A1* | 3/2016 | Ghanma | H04W 4/025 |
| | | | | 455/457 |
| 2018/0232797 | A1 | 8/2018 | Fletcher | |

OTHER PUBLICATIONS

U.S. Appl. No. 16/007,947 Office Action and 892 List of References Cited.

* cited by examiner

*Primary Examiner* — Nam T Huynh
(74) *Attorney, Agent, or Firm* — Jennifer Medlin

(57) ABSTRACT

Methods and devices facilitate and monetize merges of stalkers and targets. Responsive to an invitation from an entity of interest (target), a request is received for a real-time location of the entity of interest (target) via a user interface of at least one mobile communication device associated with a user (stalker). The request may be received responsive to an invite from the entity of interest. Responsive to the request for the location, the real-time location of the entity of interest is provided via the user interface. When the mobile communication device associated with the stalker comes within a predetermined proximity of the target, a recording of a meeting between the stalker and the target is initiated. The target is provided with a reward responsive to a first recorded meeting between a stalker and the target.

6 Claims, 20 Drawing Sheets

METHODS AND DEVICES FOR FACILITATING AND MONETIZING MERGES OF TARGETS WITH STALKERS

CROSS-REFERENCE TO RELATED APPLICATIONS

The present application claims priority to U.S. Provisional Patent Application No. 62/518,597 filed Jun. 13, 2017, the contents of which are hereby incorporated by reference.

TECHNICAL FIELD

The present invention relates to social media. More specifically, the present invention relates to facilitating and monetizing merges of targets with stalkers.

BACKGROUND

The use of social media is becoming more and more prevalent. Through social media, users are able share pictures and videos, tag other users, tag their own locations, etc.

Attempts have been made to generate revenue by selling "behind the scenes" content to a user base. These attempts have not been successful because applications like Snap Chat, Instagram, Facebook and YouTube, which provide free content to the user base, have diluted any desire for "premier" access to exclusive content.

With all the free information that is exchanged via social media, advertisers have begun monetizing. To build a following, a user of social media has to allow advertisements to be published on his or her social media page which is then viewed by other users. For example, a user interested in building a following/user views for a video may post the video on YouTube. However, for other users to view the video, they must review the advertisements. The work that each person puts into to building their following is not only socially value—it is potentially financially valuable. It would be desirable to be able make money from a dynamic following, without the need to use advertisers to gain revenue.

Applications like Snapchat and Facebook allow posts to be instantaneously shared. Locations may be indicated. However, once information is posted, other users interested in the thing, person or event posted have no way to know if the entity of interest is still at the location. The entity of interest has no incentive to stay at the place where he, she, or it "checked in". So, if a follower of the entity of interest wants to go to that place, there is no certainty that the entity of interest will still be there.

Stalking has become a common phenomenon on social media. Followers of celebrities or other entities of interest commonly "stalk" the entities by viewing their posts on social media. Stalkers may have an interest in meeting entities of interest in person. While some of the posts of entities of interest may have information indicating the location of the entity of interest at the time of the post, there is no way for a follower to know how long the entity of interest will remain at that location.

Currently there is no software application, even those having geotag capabilities, that eliminates the delay of social media posts so fans and followers can confidently go and participate at a location-of-interest in real-time.

There is thus a need to provide users with a way determine in real time where an entity of interest is and to provide an incentive for the entity of interest to remain at a location so that a user can meet or experience the entity of interest.

SUMMARY

The present embodiments relate to methods and devices for facilitating and monetizing merges of stalkers and targets. According to illustrative embodiments, a request for a real-time location of an entity of interest (target) is received via a user interface of at least one mobile communication device associated with a user (stalker). The request is received responsive to an invitation from the target, the invitation including the real-time location of the entity of interest at the time the invitation is posted. Responsive to the request for the location, the real-time location of the entity of interest is provided via the user interface. When the mobile communication device associated with the stalker comes within a predetermined proximity of the target, a recording of a meeting between the stalker and the target is initiated. The target is provided with a reward responsive to a first recorded meeting between a stalker and the target.

BRIEF DESCRIPTION OF SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawing(s). Understanding that these drawing(s) depict only example embodiments of the invention and are not therefore to be considered to be limiting of its scope, the invention will be described and explained with additional specificity and detail through the use of the accompanying drawing(s) in which.

DETAILED DESCRIPTION

Figure 1:
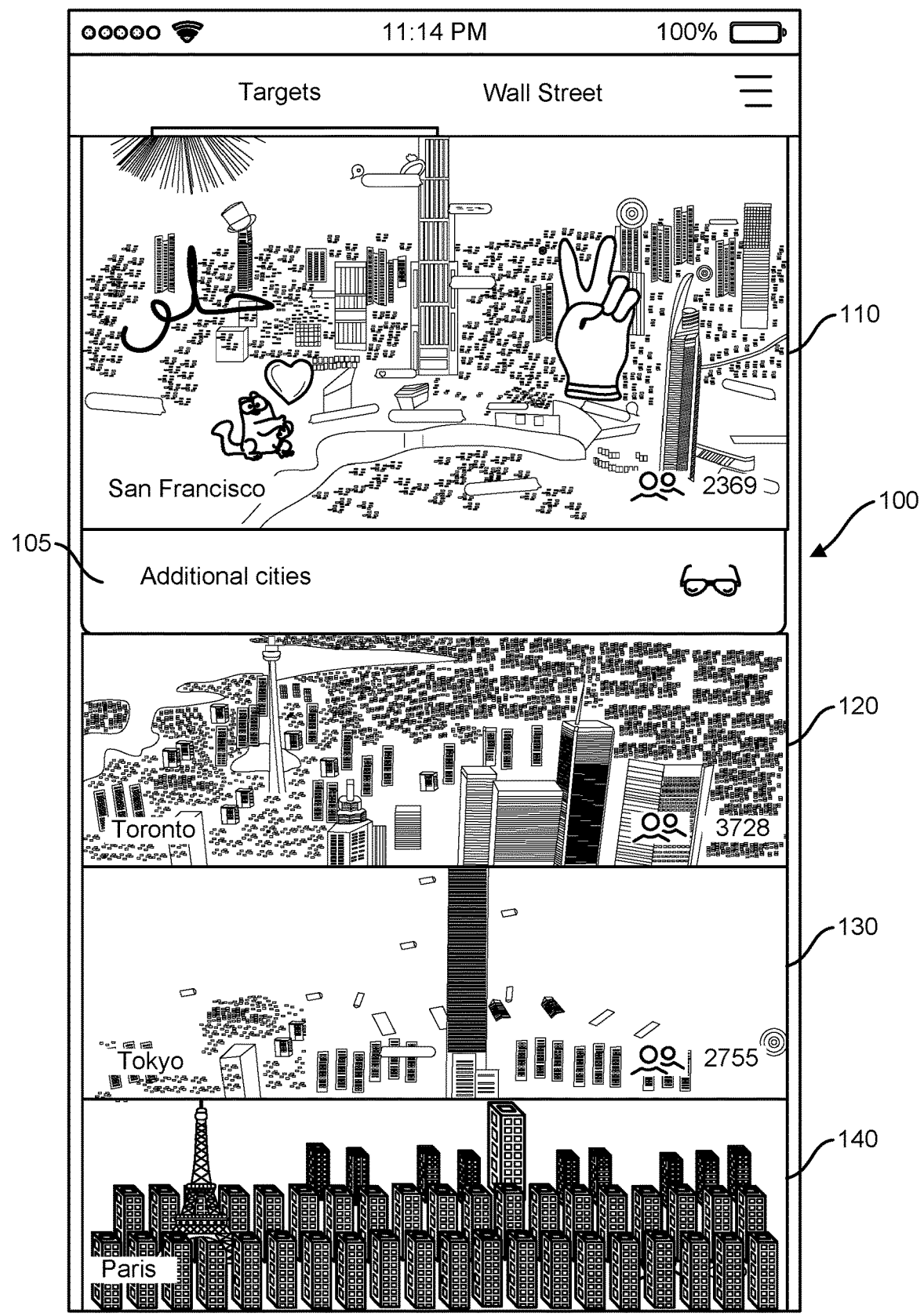
FIG. 1 illustrates a screen of a user interface populated with targets, referred to as a "landing page", according to an illustrative embodiment.

According to illustrative embodiments, methods and systems are provided that substantiate the common experience of social-media stalking. Through a versatile software application that may be executed by a processor on a mobile communication device in conjunction with a server, a search engine is provided to enable "stalkers" to find the real-time location of "targets" and to reward the target for a "merge" with a stalker. The mobile software application described herein provides super fans wanting real-time engagement and interaction with targets of interest to purchase the undisclosed whereabouts of such targets. According to some embodiments, the purchase of location information accompanies a QR barcode, which may be necessary to provide access to the experience of a lifetime.

The $talker software application described herein serves as an "in-app" point-of-sale solution for stalkers desiring the location information of celebrity meet-ups, trending activities, impromptu events, coveted experiences, invitations and premium limited-time opportunities. With the assistance of customized push-notifications, the stalker is alerted by his or her mobile communication device with the opportunity to buy the real-time hidden location of their interests. Opportunities to buy location information are related to a video invitation posted by a governed community of socially esteemed targets. The chase to the targets is a gaming experience, rewarding the stalker who arrives first with video memorabilia that lives on the target's profile page. These "merges" verify the target's willingness to interact with stalkers and exist as public bragging rights promoted within the application to its users. The $talker software application provides clear optimized visibility to locations of interest uploaded by targets, substantiates the global coordinates of these interests, and acts as the stalkers' transactional search engine for any trending fan experience or real-time target access.

It should be appreciated that the term "$talker" is giving by example only. The software application described herein may be referred to by other names, e.g., "Hyke".

As described herein, "stalkers" are the existing "active followers" from all social media platforms who want further access to an entity-of-interest, i.e., a target. The "target" is any entity that is of interest to a super-fan base. The target may be a person of interest, such as a well-known public figure (e.g., a celebrity, athlete, or politician) or social media talent, a group, such as a charity, business, or other organized group (e.g., a rock band, a fraternity, Duo, etc.), a brand, an event (e.g., a festival, day and nightlife activities), a sensational experience, an experimental event or any other influencer.

An objective of the invention is to establish and master a real-time social media geo-tag made-for-purchase for stalkers for a "stock market" price set by the targets. By using the methods and systems described herein, the delay of media posts is eliminated, so that fans and followers can confidently purchase data indicating the real-time location of entities-of-interest. According to illustrative embodiments, the community of followers may be guaranteed that the post-media invitation of any entity-of-interest is in real time, and data indicating the location of the entity of interest is for sale. The location of mobile and/or expiring entities-of-interest (i.e., location of an event that is there for a limited time) may be provided for purchase in real time.

The "$talker" software application described herein lets active followers, i.e., "stalkers" partake in the experience of a lifetime for a price that is set by and awarded to the host (target). Targets post invitations including a location, stalkers pay targets for the whereabouts of the location, and both the target and the stalker are able to interact in the experience of a lifetime that would otherwise be rare or unavailable. The $talker software application puts the opportunity to earn true-share revenue in the hands of targets—without interference. Comparatively, existing social media platforms, like YouTube, alter the threshold for the best performers to earn revenue.

The "$talker" software application described herein is the transactional solution to the cat-and-mouse game of social media stalking. Any target (i.e., mobile entity) has the ability to post media with real-time geo-tag location information available for sale to the entire stalker community. The $talker application changes the idea of social media from WHAT, to "WHO" "WHAT" "WHERE". Social media followers will begin to care more about where entities-of-interest are in real-time, as opposed to the content of their posts. While followers may "like" what an entity of interest is doing, stalkers will purchase where they are doing it. The $talker software application capitalizes on the social value of experiences and the real-time location of "social pop-ups" (people-of-interest, branded events, charities, festivals, day & nightlife activities, and sensational experiences).

Many platforms have attempted to generate revenue by selling "behind-the-scene" content to a user base. This hasn't been successful because free content from sites like Snapchat, Instagram, Facebook and YouTube have completely diluted any "premium" access to exclusive content. The $talker application works in a manner similar to Snapchat with an enhanced feature—all posts of the target have the location of the post (real-time geo-tag pinpoints) available for sale. The advantage is that 100% of the stalkers who care to know the real-time whereabouts of a target can purchase a virtual map to the on-the-spot location of the target's posts. The $talker application resides in the real-time transactional "white space" of WHO, WHAT and WHERE, providing the social media community of stalkers a transactional solution to avoid the Fear Of Missing Out ("FOMO").

According to an illustrative embodiment, a target posts an invitation using the $talker application on the target's mobile communication device. The invitation includes the real-time location of the target, e.g., GPS coordinates. It should be appreciated that a GPS location based system is referred to herein for illustrative purposes but that other location based systems may be used. Stalkers who are following the target accept the invitation, purchasing the location of the target and optionally a map to the location of the target. All the stalkers are running to find the target. When a stalker arrives within a predetermined proximity of the target, the stalker's mobile communication device initiates a recording, e.g., a video recording. The predetermined proximity may be set in advance as a default. An example of a predetermined proximity is twenty feet. The video recording may be uploaded to the stalker's page and shared with the stalker community.

If the stalker is the first to arrive within the predetermined proximity, this is considered a "merge". As used herein, a "merge" is a community broadcasted video-post confirmation that occurs when the first-to-arrive stalker reaches a target, validating the target's presence and willing participation to interact with stalkers. A stalker's merge has the same geo-tag pin location as the target's invitation. A recording of a merge is uploaded to the target's page, as well as the stalker's page. Other arrivals may also be recorded and uploaded with the recorded video of the merge shown up top, so users can see an active experience that was recorded from the merging stalker's point of view. In response to a merge, a target is rewarded.

According to illustrative embodiments, a mobile software application attaches real time, on-the-spot geo-tag information, e.g., GPS information, to the video uploads from entities of interest (referred to herein as "invites"), and provides the marketplace of stalkers with the opportunity to buy such bundled information for a varying price. Through the mobile software application, stalkers have the power to purchase the combined information for a "stock market" price set by the target. The purchase of an invite accompanies a QR barcode, which may be necessary to provide access to the experience of a lifetime. The manner in which the mobile software application works may be understood with reference to the drawings.

Once the $talker mobile application is launched, a "landing page" is presented on a screen of a mobile communication device, such as a smartphone with a touchscreen (described in detail below with reference to FIG. 15). According to one embodiment, the landing page may be the screen 100 shown in FIG. 1. As shown in FIG. 1, the screen 100 shows augmented reality (AR)/virtual reality (VR) locations with indications of the number of targets in each location. According to one embodiment, the top most depicted location 110 may be the current location of stalker's mobile communication device. The other depicted locations 120, 130, and 140 may be displayed in order from the location in which the most targets are located to the location in which the least number of targets are located. A new location may be added using the dialog box 105.

It should be appreciated that the dialog box 105 may, at first be hidden from a user. The dialog box 105 may be presented to the user responsive to the user selecting a location, causing a location shown above the selected location to be removed from view. In this case, another location may also be presented to the user below the selected location.

It should further be appreciated that if the $talker application is installed on the mobile communication device, the application may be launched by simply logging in. If the $talker application is not installed, it may be installed and then launched via "deep linking" with another social media platform.

The screen 100 shown in FIG. 1 shows locations and targets that have been populated by a stalker. This screen shows an AR/VR depiction of the targets a stalker is currently stalking. The locations 110 and 130 include avatars indicating invitations posted by active targets. Although not shown, avatars may also be included in the other locations 120 and 140 to indicated invitations posted in those locations. It should be appreciated that the locations (in addition to the current location) and the targets may be populated by a stalker.

According to this embodiment, the landing page shown in FIG. 1 is a tight sales funnel. A user needs to escape the landing page by, e.g., scrolling up, revealing a top slider that reads, e.g., "Targets|Stalk Live", and selecting "Stalk Live" for the ability to explore within the $talker application and use the minibar. It should be noted that when a user lands on the landing page, he or she may also swipe the screen from "right-to-left" to exit the landing page and reach the "Stalk Live" screen shown in FIG. 3 and described below.

Figure 3:
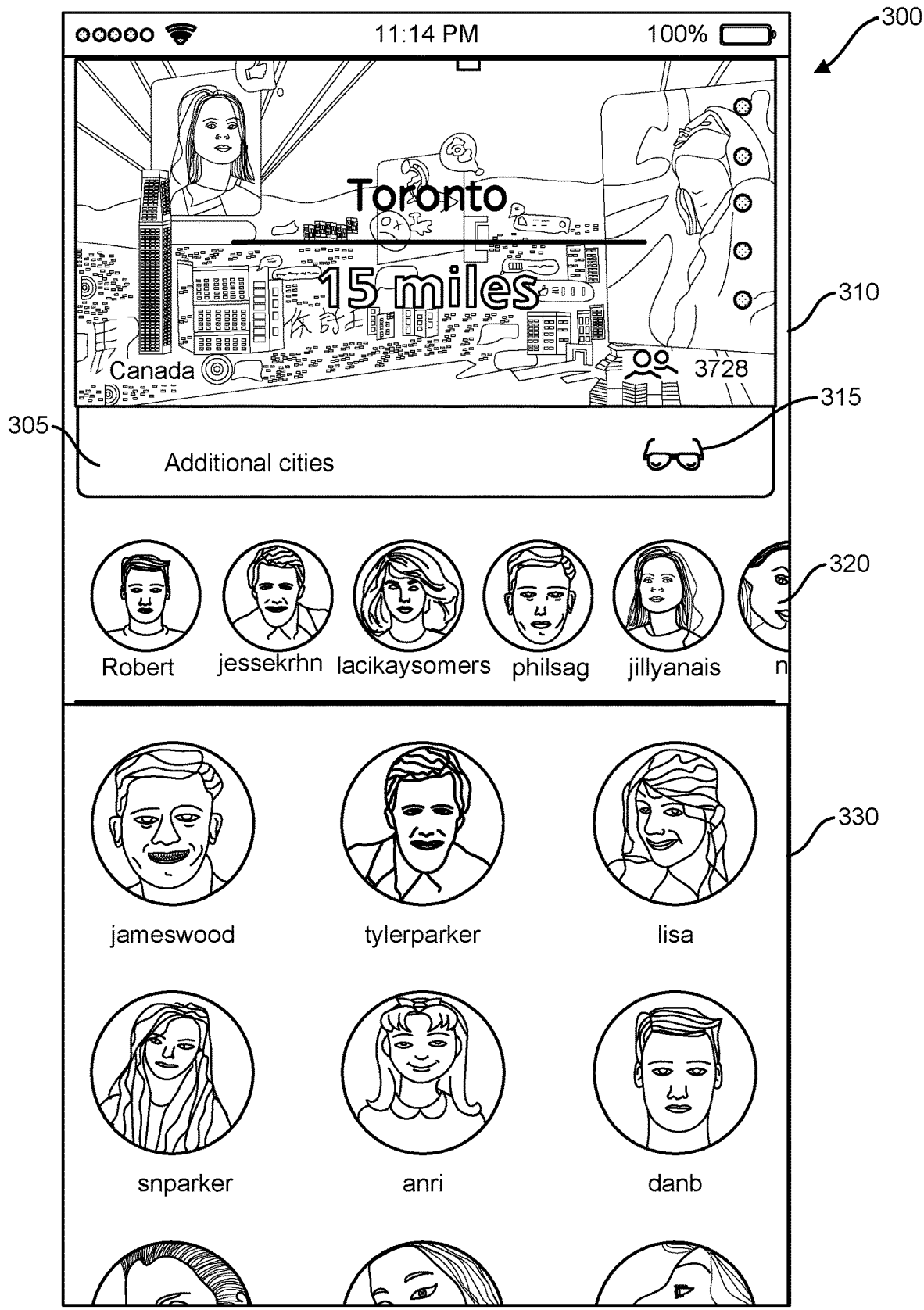
FIG. 3 illustrates in detail a "Stalk Live" screen illustrating targets and locations according to illustrative embodiments.

According to another embodiment, instead of the screen 100 shown in FIG. 1 being the landing page, the "Stalk Live" screen shown in FIG. 3 may be the landing page.

Figure 2:
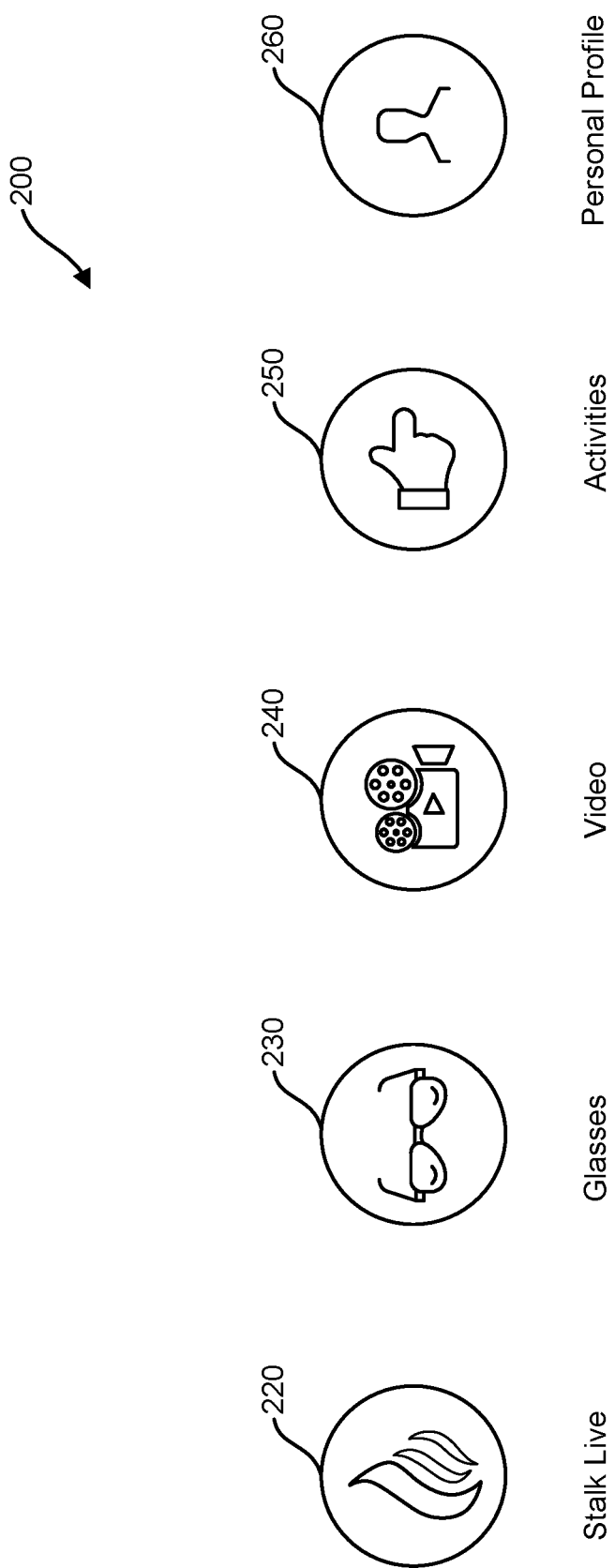
FIG. 2 illustrates examples of tabs on a user interface, referred to as a "minibar", of a mobile communication device according to illustrative embodiments.

FIG. 2 illustrates examples of tabs shown on a user interface, referred to as a "minibar", of a mobile communication device according to illustrative embodiments. Referring to FIG. 2, the minibar 200 is presented to a user if he or she successfully escapes the landing page (also referred to as a "sales funnel") to view the trending targets. It should be appreciated that, although the screens depicted in FIGS. 1 and 3 do not include visible minibars, a minibar such as that shown in FIG. 2 may be displayed, e.g., at the bottom of these screens.

As shown in FIG. 2, the tabs included in the mini bar are: "Stalk Live" 220, "Glasses" 230, "Video" 240, "Activities" 250, and "Personal Profile" 260. Selection of the "Stalk Live" tab 220 reveals trending targets the user does not stalk but might be interested in, e.g., because these targets' social values have spiked. These targets may be shown, along with a location, on a screen such as the screen 300 illustrated in FIG. 3.

Referring to FIG. 3, the screen 300 depicts a current location 310 with avatars overlaid that indicate posted invitations of active targets within a predetermined radius, e.g., 15 miles. The screen also includes a dialog box 305 which may be used to add additional locations, a row 320 of targets that are being stalked, and rows 330 of trending targets that a user may be interested in stalking. The screen shown in FIG. 3 may be presented in response to a user selecting the "Stalk Live" tab 220. In addition, the screen 300 may be presented in response to a user selecting a location on the screen 100 to reveal a detailed view of available target invitations at that location.

Figure 4A:
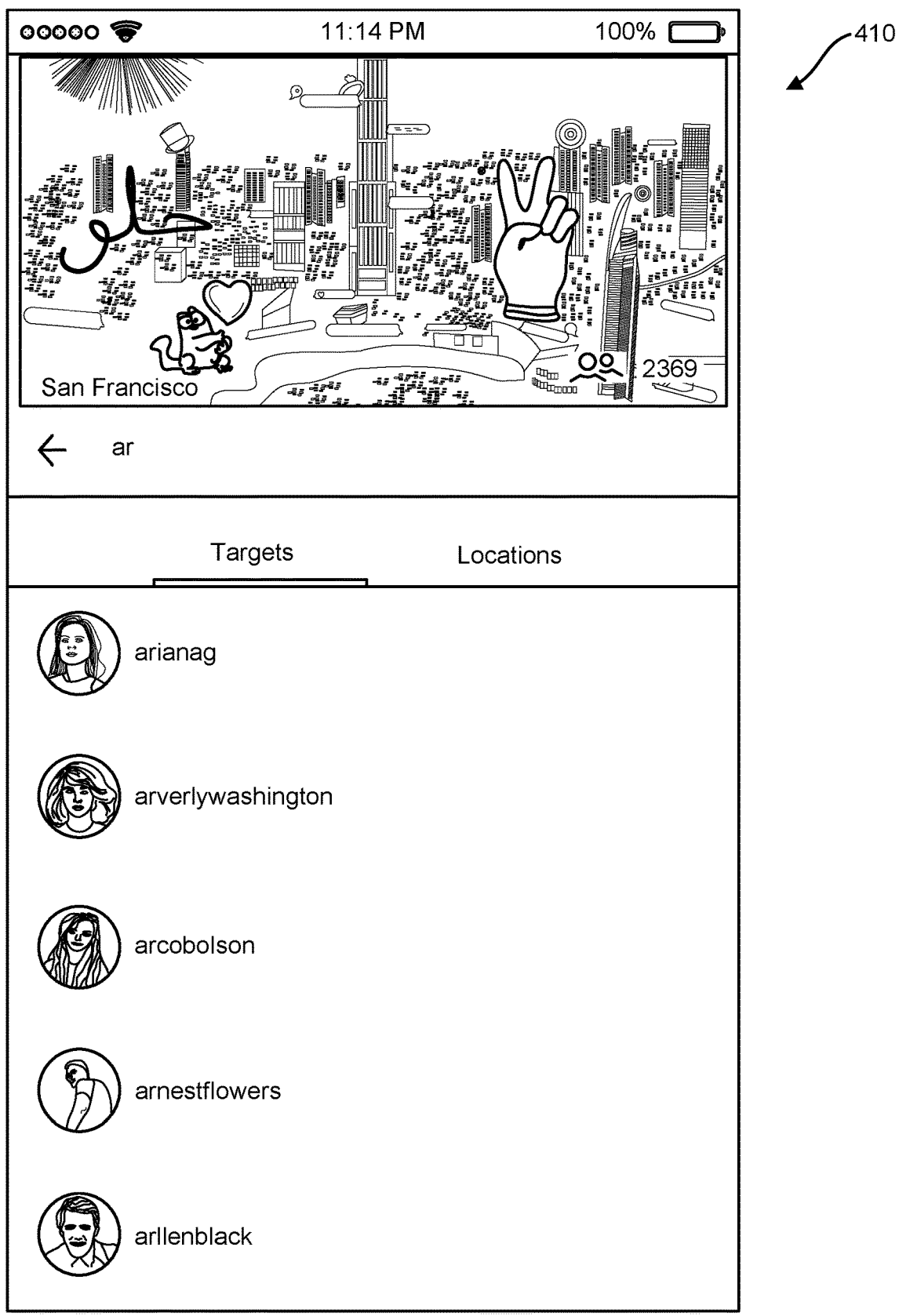
FIGS. 4A and 4B illustrate screens of a user interface for searching for one or more targets and one or more locations, respectively, such screens being accessible via a "Stalk Live" tab according to illustrative embodiments.
Figure 4B:
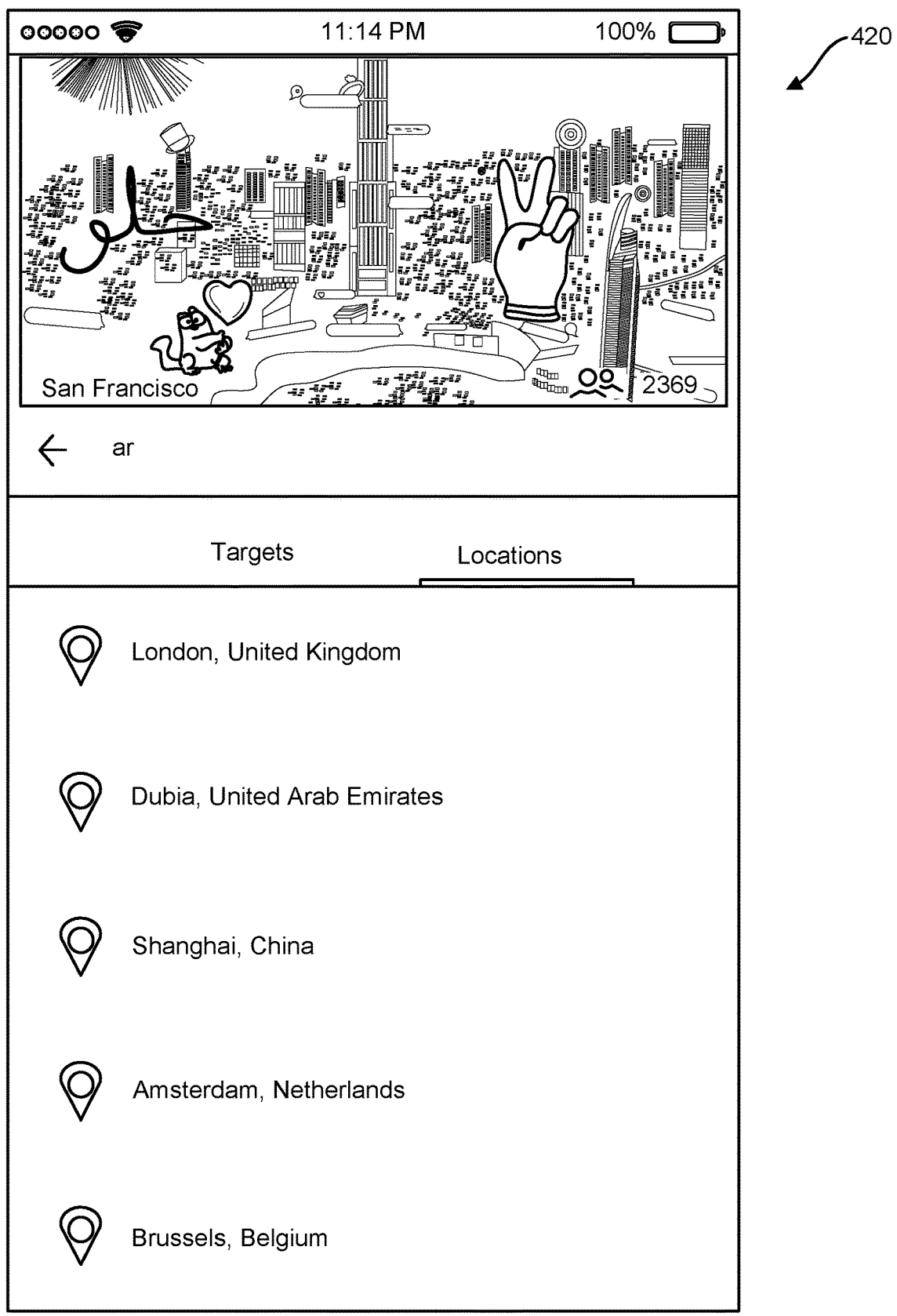
Figure 6:
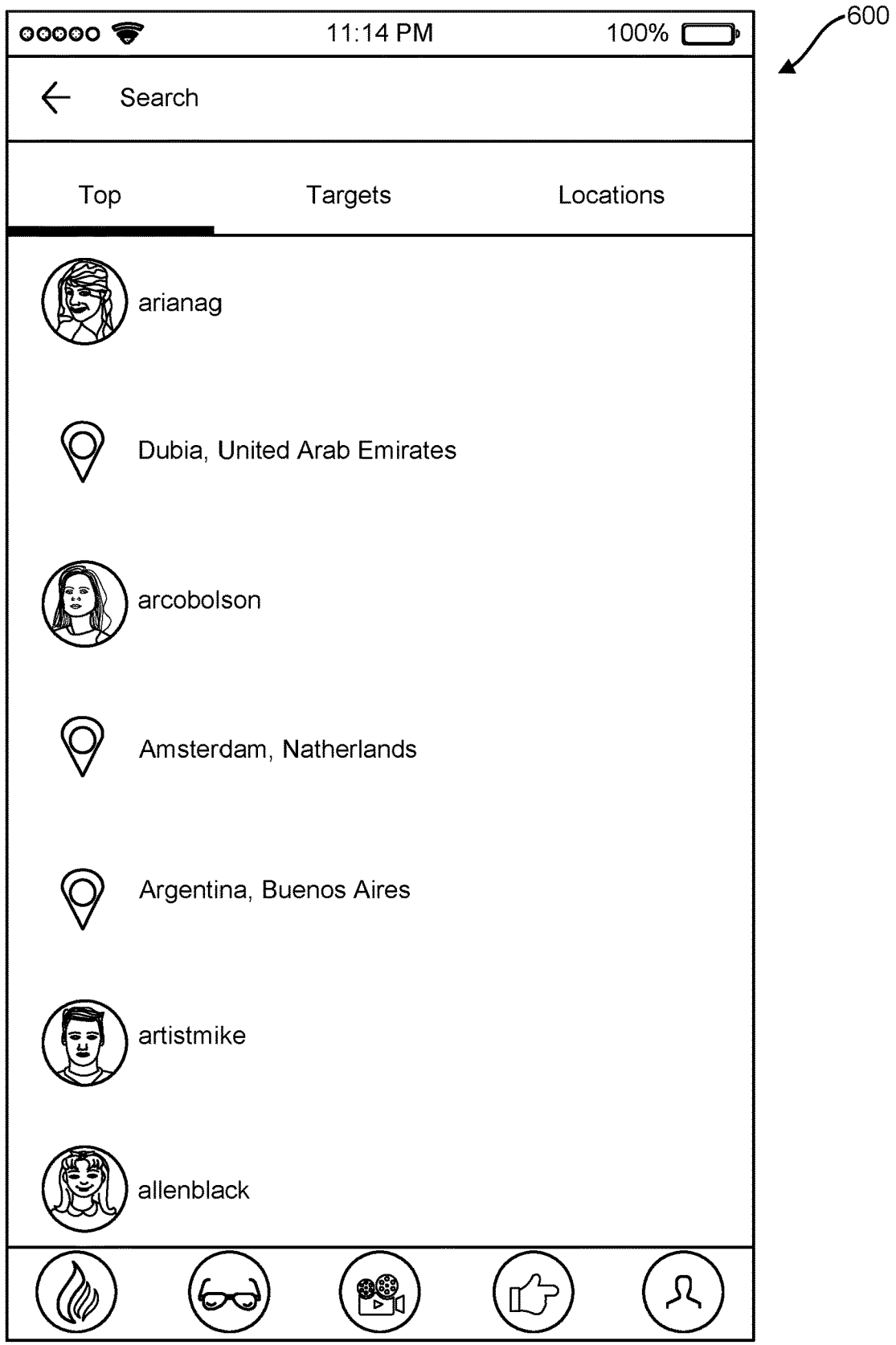
FIG. 6 illustrates a screen of a user interface for searching for targets and locations that is accessible via a "Glasses" tab according to illustrative embodiments.

Referring to FIG. 3, the "Glasses" tab 315 is used for an existing target search preselected by a stalker. This search may include a search for targets using the screen 410 shown in FIG. 4A and and/or a search for locations using, for example, the screen 420 shown in FIG. 4B. It should be appreciated that the entire application base of targets and/or locations may also be searched for via the "Stalk Live" tab 220 via, for example, a screen 600 shown in FIG. 6.

Figure 7A:
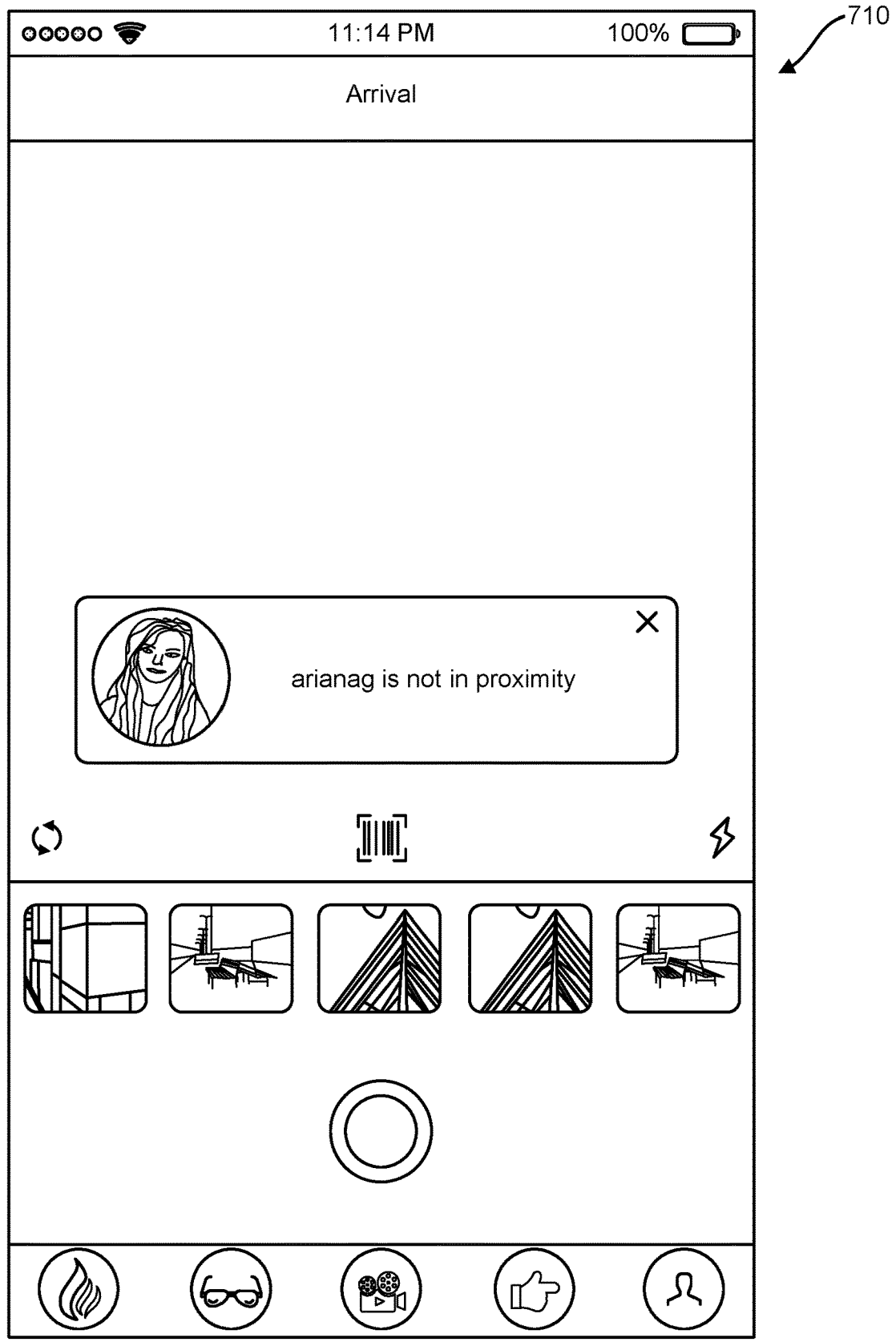
FIGS. 7A and 7B illustrate screens of a user interface showing the progress of video recording of an arrival/merge that is accessible via a "Video" tab according to an illustrative embodiment.
Figure 7B:
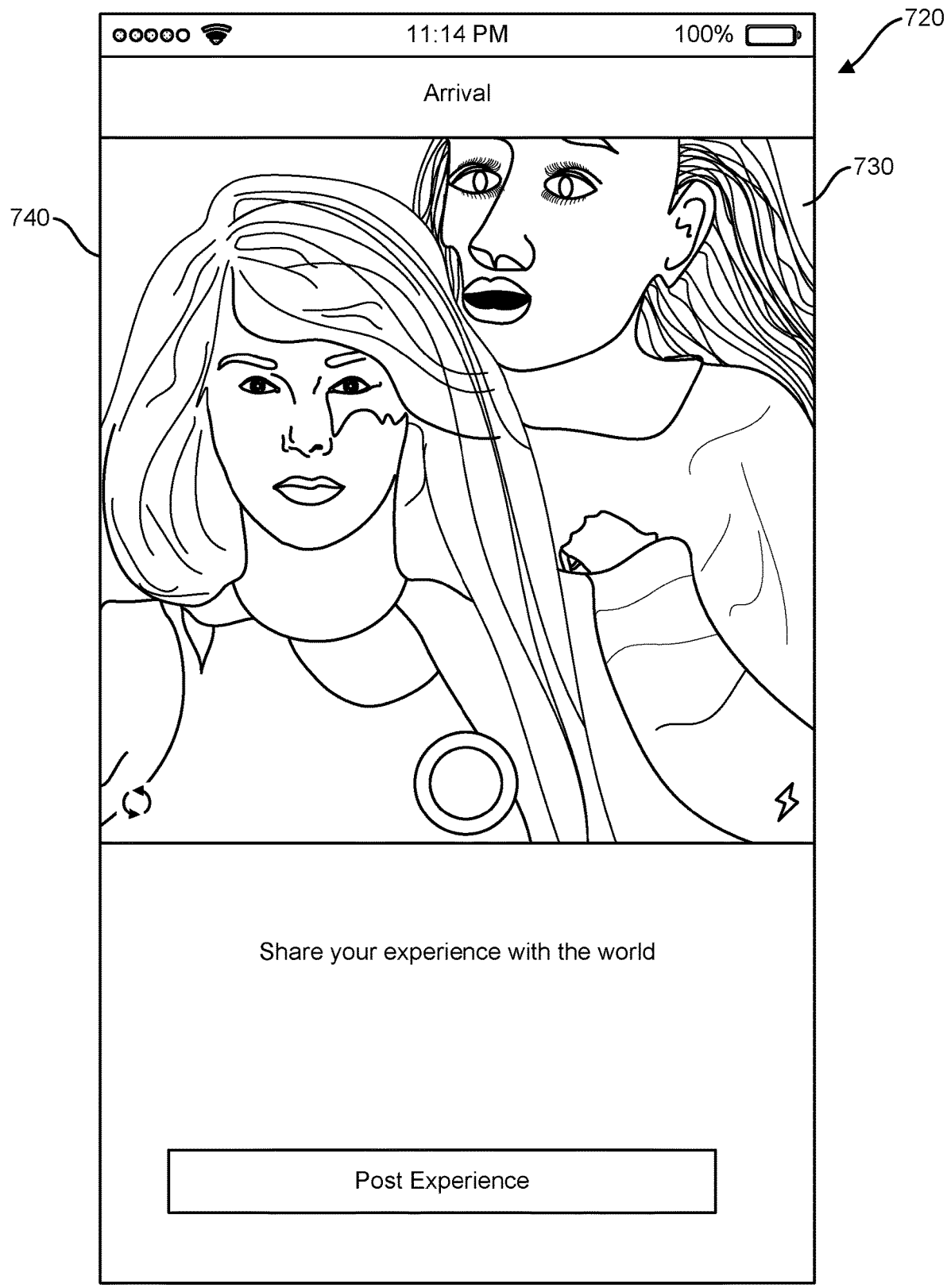

The "Video" tab 240 is used to initiate and/or show the progress of recording an arrival/merge of a stalker within a predetermined proximity of a target using screens 710 and 720 shown in FIGS. 7A and 7B. The screen 710 shown in FIG. 7A indicates that a user is not within a predetermined proximity of a target, while the screen shown in FIG. 7B depicts the recording of an arrival/merge of a target 730 and a stalker 740 from a stalker point of view (POV). If the stalker is the first to arrive at the location of the target, the arrival is recorded as a merge and is visible, for example, as a merge 1210 in the screen 1200 shown in FIG. 12. Although FIGS. 7A and 7B depict the progress of recording an arrival/merge from a stalker POV, it should be appreciated that the recording of invites from a target POV may also be initiated and shown using the "Video" tab 240.

Figure 8:
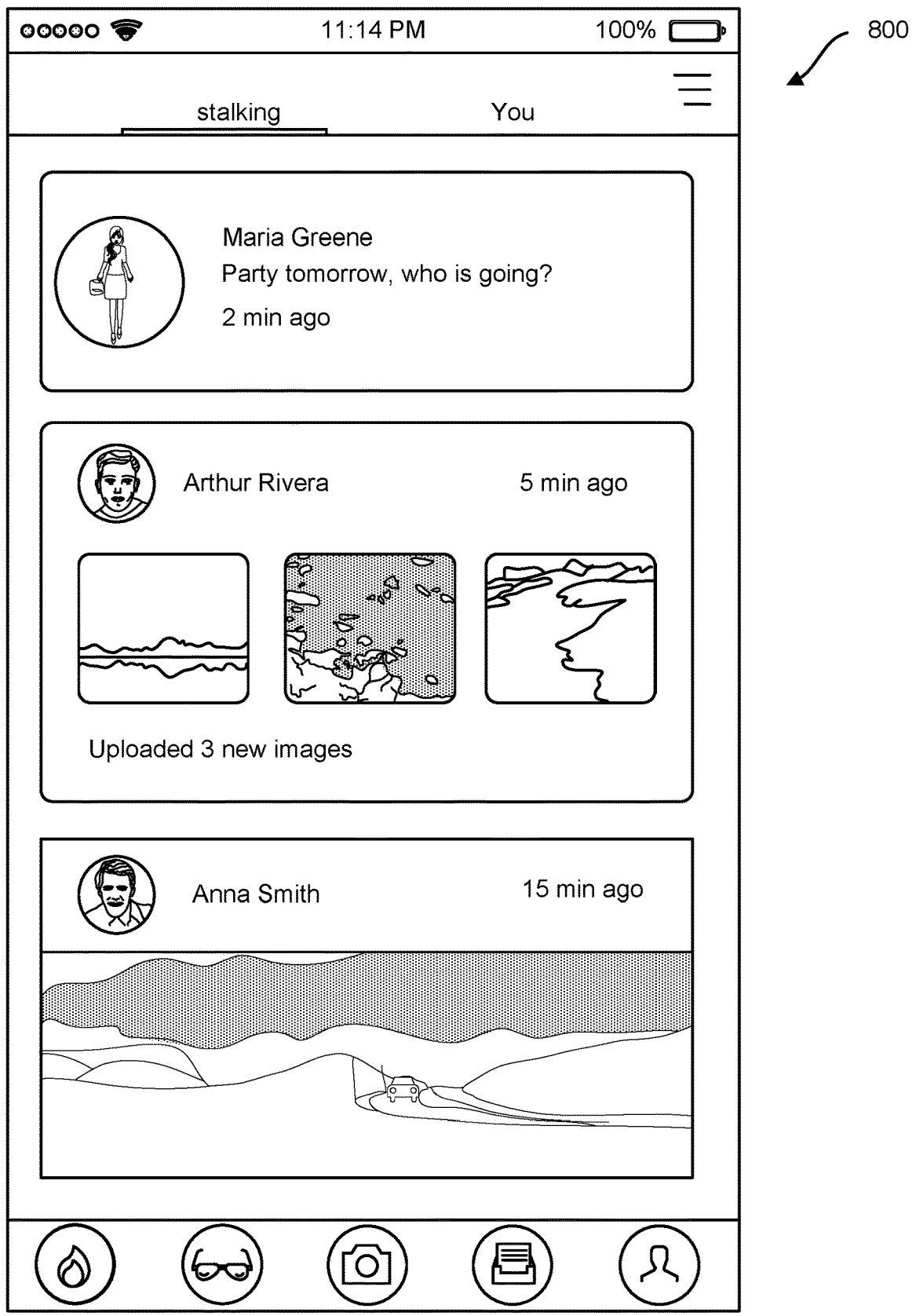
FIG. 8 illustrates a screen of a user interface showing activities of targets that is accessible via an "Activities" tab according to an illustrative embodiment

The "Activities" tab 250 is used to reveal activities of targets via, for example, the screen 800 shown in FIG. 8. As shown in FIG. 8, the screen 800 shows activities of the targets (screenshots of invitations made by targets in a chronological linear feed form. More detailed activities of targets may be shown to user with a prestige subscription.

According to an illustrative embodiment, the prestige subscription allows users to see other stalkers. It allows them to "stalk", for example, five other stalkers (who are not targets but who have social media profiles. The prestige subscription also allows users to see who is stalking them. In addition, the prestige subscription allows user to stalk a target in "Ghost Mode". For example, a stalker might want to "ghost" her identity, such that targets cannot view her actual identity but instead see a "ghost" identity.

Figure 9:
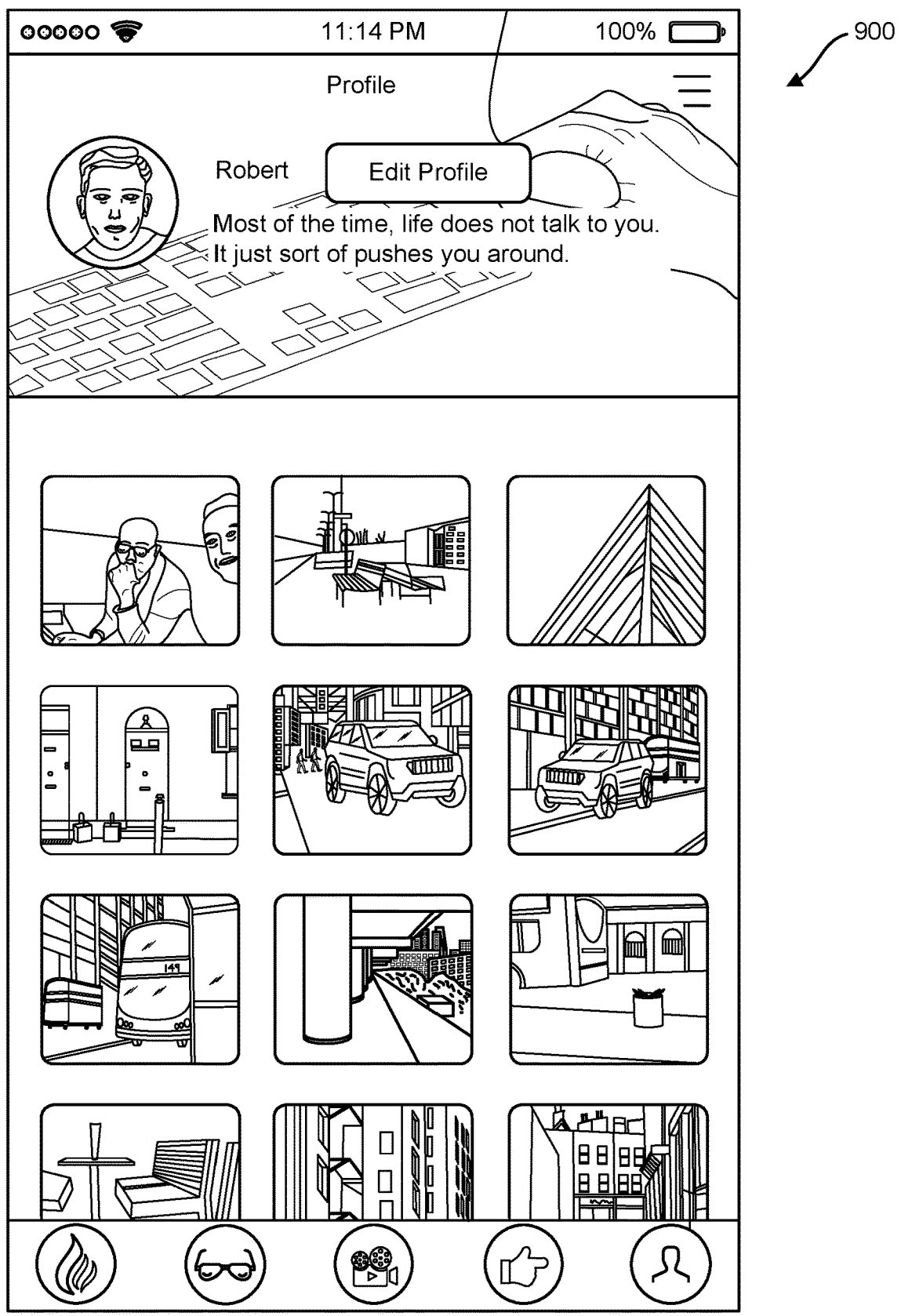
FIG. 9 illustrates a screen of a user interface showing a stalker profile page that is accessible via a "Profile" tab according to an illustrative embodiment.

Referring again to FIG. 2, the "Personal Profile" tab 260 is used to show the details of a stalker using, for example, the screen 900 shown in FIG. 9.

Figure 5A:
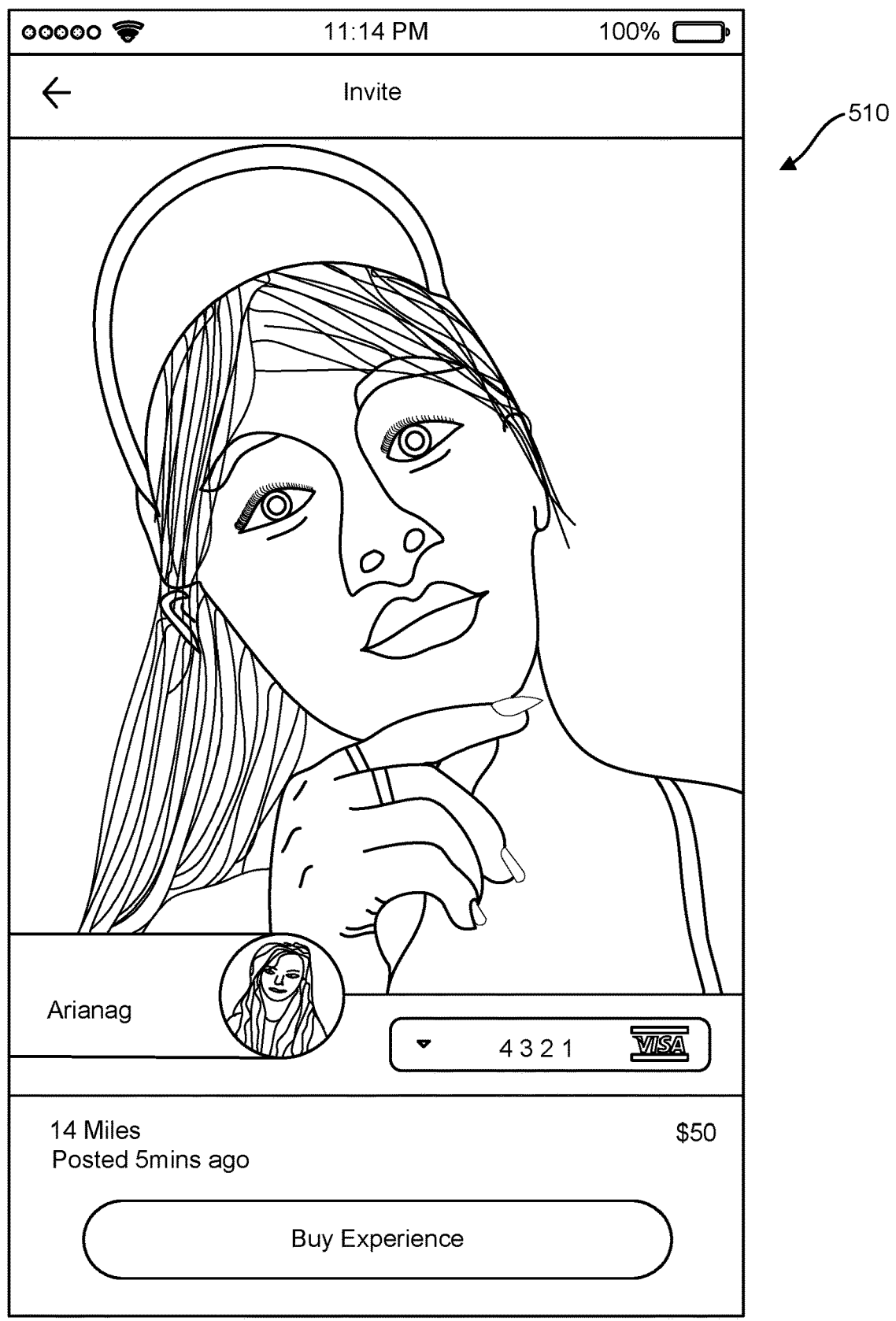
FIG. 5A illustrates a screen of a user interface for purchasing a target invite according to an illustrative embodiment.
Figure 5B:
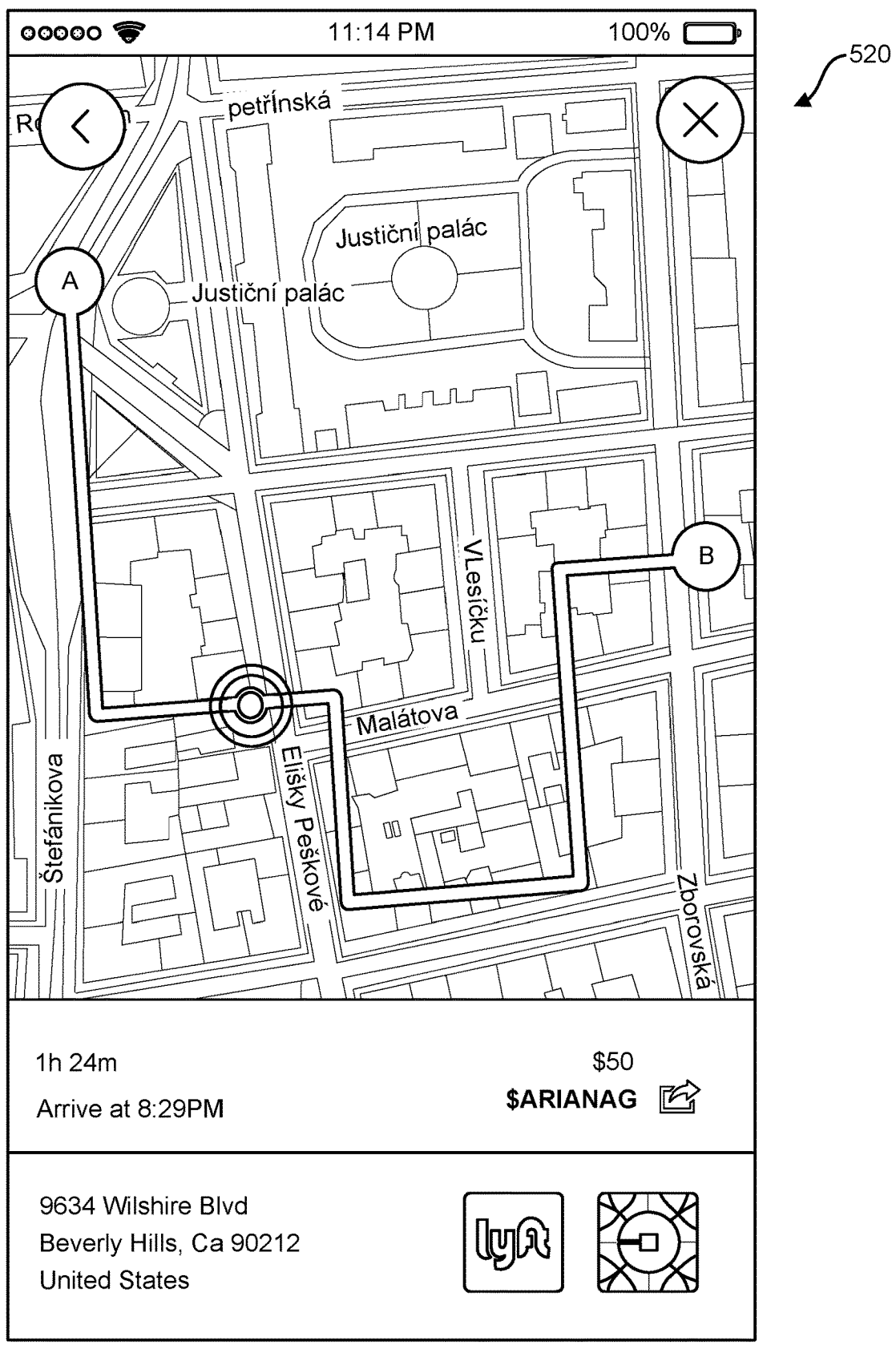
FIG. 5B illustrates a screen of a user interface showing a map reward according to an illustrative embodiment.

FIG. 5A illustrates a screen 510 for purchasing a target invite according to an illustrative embodiment. As shown in FIG. 5A, the target invite screen 510 includes options for purchasing the invite. FIG. 5B illustrates a screen 520 showing a map reward that is provided to a stalker in response to the user responding to the target's invite according to an illustrative embodiment. As shown in FIG. 5B, the map reward screen shows a map from a start location "A" of the stalker to an end location "B" of the target. The screen 520 includes advertisements. Additionally, the map reward screen may include coupons. The screens 510 and 520 may be accessible via the "Stalk Live" tab 220 shown in FIG. 2.

As shown in FIG. 5A, an invite from a target which a stalker is stalking is presented via the screen 510. Upon accepting the invite, the stalker is presented with the location of the target at the time of the invite including, for example, a map to the target's location via the screen 520. Although not illustrated, the stalkers may also be presented with a QR barcode which may be necessary when the stalker arrives at the location. The QR barcode does not have to be scanned by a target for a merge to occur, but it may be needed, e.g., for validation.

By "swiping up" on the screen 520, a stalker may be presented with coupons or ads for promotions along the map route, which he/she may accept via the user interface on the screen, e.g., by clicking on the user interface on the screen. Stalkers may eliminate such coupons and ads with the use of a subscription model. Additionally, coupons may be provided when a stalker reaches the location of the invite from the target, in case, for example, the target is no longer at the location when the stalker arrives or if an advertiser works with the $talker application as a partner.

The stalker may also be presented with a receipt via the user interface, e.g., by "swiping down" on the screen 520. This receipt may or may not be needed for access once the stalker arrives at the target's location. The receipt may include an interactive button which, when pushed, activates AR. Stalkers may track the location of the target in a manner similar to that in Pokémon Go™. When the first-to-arrive stalker's mobile communication device comes within a predetermined proximity of the target's location (or the location of the target's mobile communication device) and the stalker records and uploads their arrival, a merge automatically happens.

A video camera may be selected via the "Video" tab 240, or a video camera may be automatically launched, for the first to arrive stalker to record their arrival at the target's location. If the stalker is not the first to arrive, he or she may still record an arrival using, e.g., the "Video" tab 240, if he or she is at the location of the target and with the target.

Figure 12:
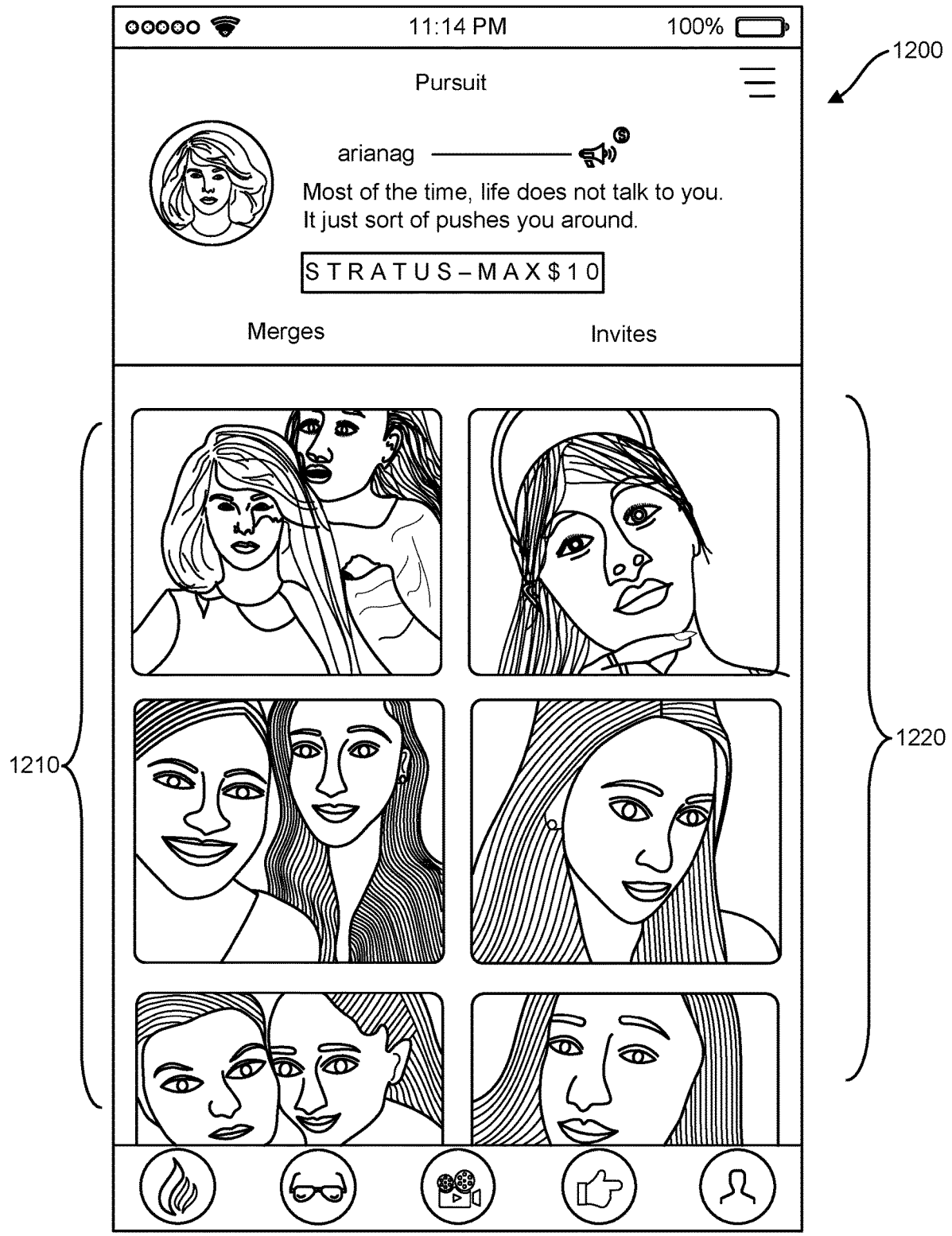
FIG. 12 illustrates a screen of a user interface showing a merge posted on a target's social media pursuit page according to illustrative embodiments.

Recording of a stalker's arrival may be posted on a profile page of the stalker shown, for example, as a screen 900 in FIG. 9. Once a merge occurs the merge may be posted on a target's pursuit page shown, for example, as a screen 1200 in FIG. 12. As shown in FIG. 12, merges 1210 may be paired with corresponding invitations 1220.

Figure 10:
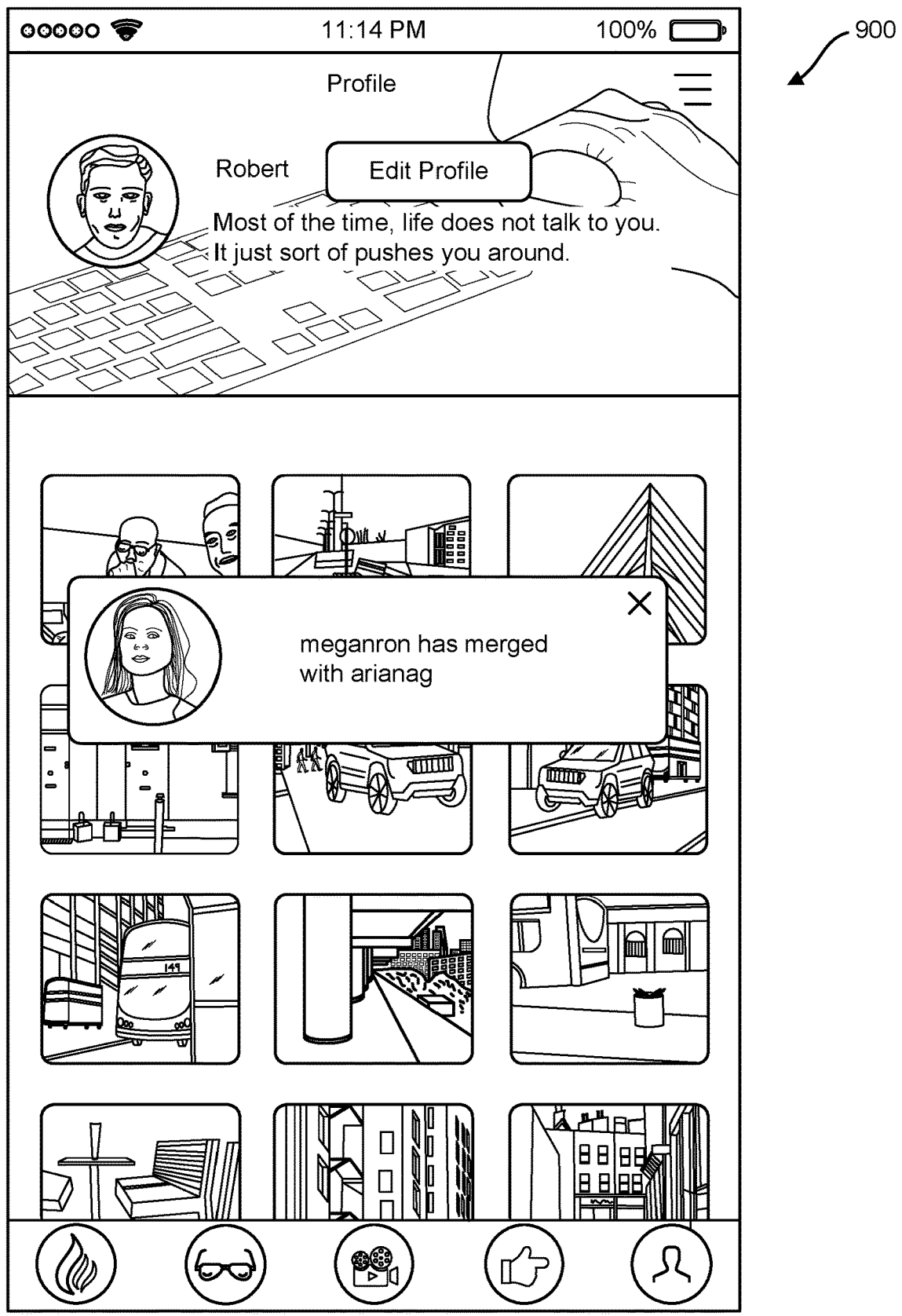
FIG. 10 illustrates a screen of a user interface notifying stalkers of a merge according to an illustrative embodiment.
Figure 11:
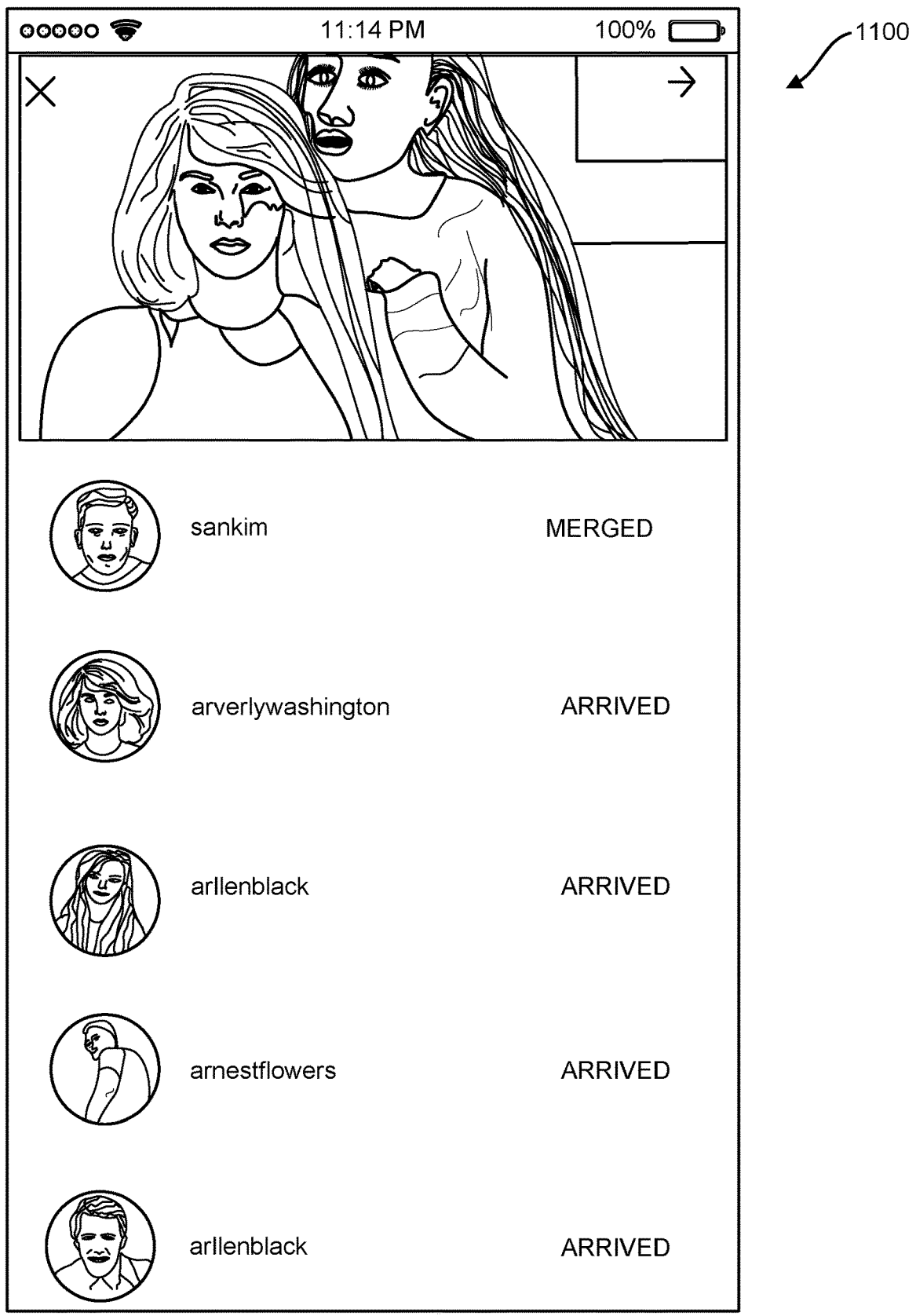
FIG. 11 illustrates a screen of a user interface notifying stalkers of merges and arrivals, from an arriving stalker's point of view, according to illustrative embodiments.

FIG. 10 illustrates a screen 1000 notifying paying stalkers actively on the chase of a target of a merge according to an illustrative embodiment. FIG. 11 illustrates a screen 1100 notifying paying stalkers of merges and arrivals from an arriving stalker's point of view, described in more detail below.

According to illustrative embodiments, targets post media content and can control their own market value through a pricing system referred to herein as the "power wheel". The targets can manage their own demand and the elasticity of their capture rate.

According to illustrative embodiments, the $talker software application may be free to download and free to explore within the application. Gear-based pricing may limit a target's initial post to, for example, $0.99. Effectively, targets can accurately gauge their volume of stalkers, early adopters have the opportunity to participate at low financial risk, and $talker maximizes community growth exponentially. With more activity, targets gain flexibility to charge more. The incremental pricing levels dynamically incentivizes target participation and establishes momentum. There may also be premium add-ons for stalkers, targets, and enterprises.

As an example, an initial post of every target is $0.99, launching their Integrity Post. A target's second post activates the Power Wheel, and the price range increases incrementally based on the number of posts by the target on the application. An example of a target's earnings is shown in Table 1.

TABLE 1

| Power Wheel Showing Earn Potential of a Target | Stalkers | Pricing | Earnings |
| --- | --- | --- | --- |
| First Post - Integrity Post (Mandatory $.99 Pricing) | 5000 | $1 | $4,950 |
| Second Post - Grand Opening (maximum $10 Pricing) | 4000 | $10 | $40,000 |
| Tenth Post - Mezzanine Access (maximum $100 Pricing) | 2000 | $25 | $50,000 |
| 25th Post - Penthouse Access (maximum $1,000 Pricing) | 200 | $1000 | $200,000 |
| 50th Post - Skyscraper Access (maximum $10,000 Pricing) | 20 | $10,000 | $200,000 |
| 100th Post - Stratus Access (maximum $100,000 Pricing) | 5 | $100,000 | $500,000 |
| 200th Post - Galactic Access (maximum $1,000,000 pricing) | 2 | $1,000,000 | $2,000,000 |
| Total | | | $2,994,950 |

The mandatory Integrity Post priced at $0.99 is set so that targets can accurately gauge their volume of stalkers, so that all stalkers have initial access to targets, and to maximize customer acquisition exponentially. The purpose of the incremental power wheel is to allow targets to better understand their market value, preventing targets from pricing themselves out. Targets pricing themselves out will diminish demand, as stalkers will lose interest. It is expected that any target will better understand their "stalker demand" by charging less than a dollar for their initial post. Having the incremental levels dynamically incentivizes user participation and establishes momentum.

Psychologically, incremental levels "gamifies" the target's participation and plays to his/her/it's ego. Tiered milestones play to both personal and social esteems as one compares themselves to their counterparts.

Because access levels directly relate to the ability to charge higher pricing for post, targets are rewarded financial flexibility for increased activity and greater participation. Defining status by levels is a natural social media progression and creates a necessary hierarchy to profile top performers.

The preservation of a positive user-experience is important and essential for long-term growth, customer retention, and scalability. The power wheel pricing feature provides a linear way to preserve the value, expectations, and quality of interactions between stalkers and targets.

It is important that both parties want to connect and share in the emotional gratification for the $talker application to preserve its positive reputation and continue to work successfully among the community. For any price set by a target at post, a stalker needs to have assurance that what they pay for has the highest reward potential. That is why the artificial target-to-stalker magnetism, referred to herein as a "merge" is provided. As noted above, a "merge" is a community broadcasted video-post confirmation that occurs when the first-to-arrive stalker reaches a target, validating the target's presence and willing participation to interact with stalkers.

According to an illustrative embodiment, merges are advertised to the community of paying active stalkers on the chase, creating the highest level of customer assurance that the target is presently waiting for stalkers to arrive, and "gamifies" the race-to-target experience. Every target has to merge or connect with a first-to-arrive stalker to release their money from escrow. This helps avoid targets from posting and ditching.

According to an illustrative embodiment, a video is uploaded with the target by the first-to-arrive paying stalker with the same GPS pinpoint as the target's video post. The first person who reaches a target lets the community of active stalkers know the target is actually present. As shown in FIG. 11 described above, this video is advertised to all the paying stalkers chasing the target. Referring to FIG. 11, once a merge has occurred, the video invitation from a target will change to depict an indication that a merge and arrivals have occurred, with the recording of the merge shown up top. For example, assume that a Stalker K has purchased the video invitation and then later checks the invitation after purchase (perhaps to see if other stalkers have arrived at the target's location). If a merge has occurred, this screen will be shown to Stalker K instead of the original video invitation. The screen 1100 shows not only that a merge has occurred but that other stalkers (e.g., Stalkers B-J) have also arrived ahead of Stalker K. In this case, Stalker K is presented with the merge from Stalker A's point of view instead of the video invitation from the target By advertising its merge with the target in this manner, the first-to-arrive stalker gains "bragging rights" which, in turn, becomes a way for the best stalkers to become internal celebrities in the "stalker community". This is also a way for stalkers to collect video memorabilia for their successful arrivals with targets, earn them redeemable points, perhaps a free stalk in the future (up to Mezzanine Access)—maybe even money as the first-to-arrive will post for $0.99 and advertise their successful merge to the community of active stalkers on the hunt. Over time, the best (most successful as first-to-arrive) stalkers will have a library of uploaded videos of their successful merges, which may gain them their own stalker-to-stalker fan base.

According to illustrative embodiments, mutual emotional rewards for merges are constantly reinforced. In this target-to-stalker gravitation, the stalker who merges gets some sort of face time with their target, and the target gets paid for interacting with the first-to-arrive stalker. The merge may happen according to a "99:1 rule", e.g., the target is incentivized to go the last thirty feet toward greeting a stalker who may have traveled thirty miles or more. With the merge, the targets also become enthusiastic to share in the joy of the merge, recreating the "airport hugs" commonly seen in movies and television shows.

Because of the vast reach of billions of weekly-active-users (WAUs) on existing social media platforms worldwide (i.e., Facebook, Instagram, Twitter, Snapchat, YouTube, etc.), combined with the $talker application's monetized social media exchange, once the first hot target advertises his/her/it's location to the existing social media super-fan base, the $talker application's community will exponentially acquire new free customers who are highly galvanized to purchase the $0.99 optional entry buys to find out where their "idol" is located on the globe. It is expected that nearly 100% of stalkers signing up for the $talker application will pay "less than a dollar" for the emotional satisfaction of this new ability of locating, and potentially meeting their idol in person—no matter the distance. The community will only continue to build on itself and "go viral".

Stalkers may be further defined as any fan wanting to purchase and arrive at the location of a video post from a target with the possibility of interacting with the target, and participating in the game where the first-to-arrive stalker is rewarded with points and video proof of the interaction that lives on the target's public pursuit page and broadcasted for the world-at-large to see.

According to illustrative embodiments, both the stalkers and the targets must play within the parameters to get rewarded by either merges, video memorabilia called "arrivals", prizes, rewards, or earning cash. These parameters are driven by two key factors: video validation and restrictive proximity. Much like any sport, there are specific criteria and rules of engagement guide-lining players through restrictive measures to score and achieve goals.

According to illustrative embodiments, participation by stalkers and targets is restricted such that only those who "play the game right" are rewarded. One restriction is that only content uploaded using the Stalker application may be shared in the stalker community (whether the content is a video recording of an invite, a merge, or an arrival). This eliminates "fake" invites, and helps to drive the most authentic target validation. This also ensures that the present-time personality of the target is displayed so that stalkers can accurately gauge their expectations in real-time.

Another restriction is that the targets' rewards are held in escrow. The targets have to merge with the stalkers for the target to collect their rewards.

A third restriction is that stalkers can only record their merges and their arrivals when they arrive substantially at the location indicated in the target's invitation and are within a predetermined proximity, e.g., six feet, of the target.

It should be appreciated that there is an inherent risk in targets meeting their stalkers, as stalkers are super-fans wanting a face-to-face experience with the targets. According to an illustrative embodiment, features are provided to reduce the risk of harm. One feature called "$WARM" provides the target with information on the fastest approaching stalkers. Another capability to price up the power wheel to decrease the amount of stalkers on the chase lowers the number of stalkers willing to pay more for the interaction. For lower price points, strength in numbers indirectly lowers the risk of abduction or harm. Also, targets are provided with the ability to block a particular stalker from notification of video posts. These are all ways in which targets are empowered to manage their safety.

Figure 13:
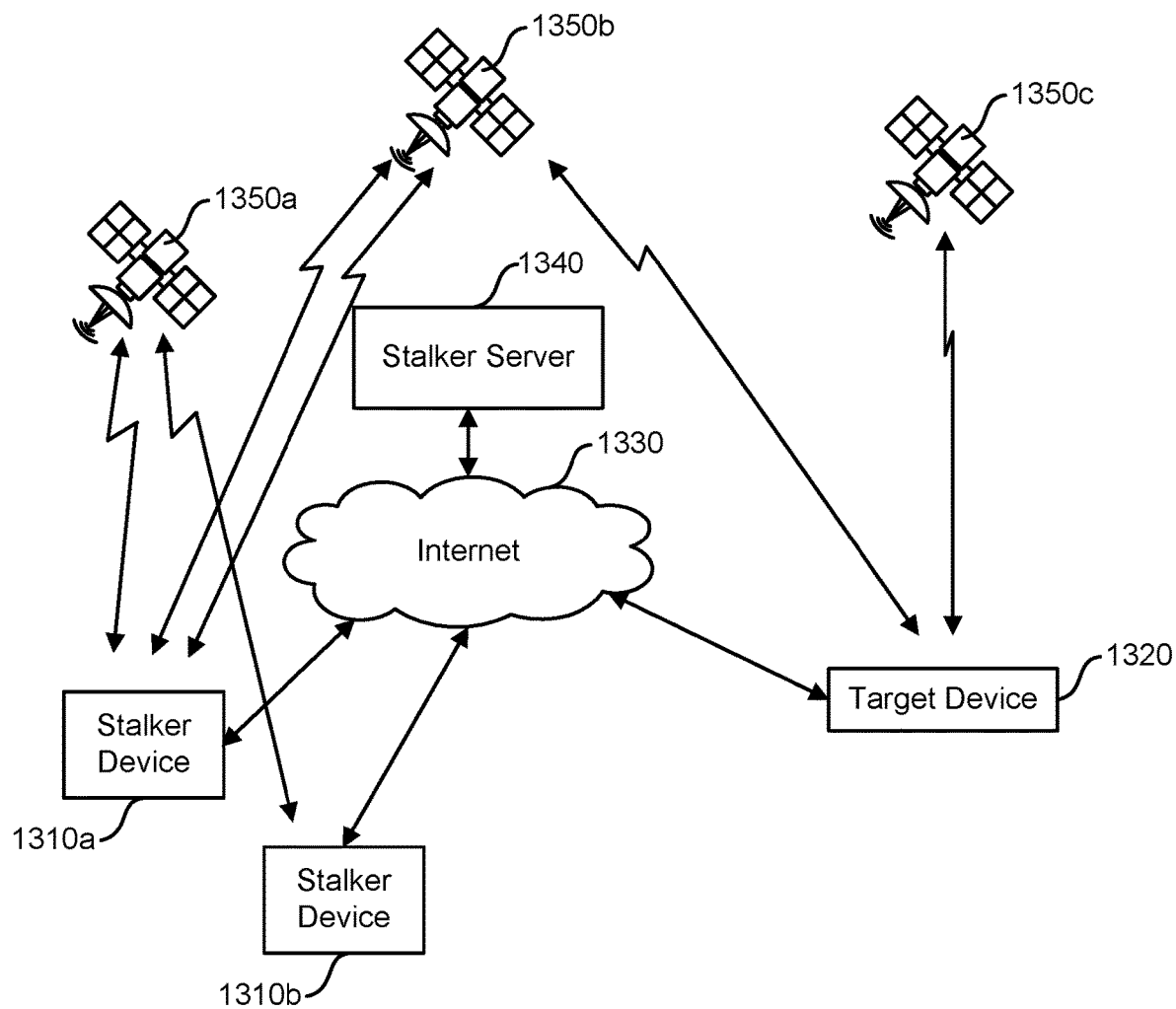
FIG. 13 illustrates a system including devices for facilitating merging and monetizing of merges according to illustrative embodiments.

Turning now to details of implementation of the $talker application, FIG. 13 illustrates an environment in which the $talker application may be facilitated according to an illustrative embodiment Stalker communication devices 1310a and 1310b are associated with stalkers, and a target communication device 1320 is associated with a target whom the stalkers are stalking. Although only two stalker communication devices and one target communication device are shown for simplicity of illustration, it should be appreciated that there may be any number of such devices at various locations. The stalker communication devices 1310a and 1310b and the target communication device 1320 are in communication with a $talker server 1340 via, e.g., the Internet 1330 or any other suitable communication network, e.g., a combination of a cellular network and the Internet.

According to an illustrative embodiment, users of the stalker communication devices 1310a and 1310b populate the devices with targets and locations, and this information is communicated by the devices 1310a and 1310b to the $talker server 1340 via, e.g., the Internet 1330. A user of the target communication device 1320 populates the device with invites (including the location of the target with an accompanying QR barcode/receipt), and the device 1320 communicates this information to the Stalker server 1540 via, e.g., the Internet 1330.

GPS satellites 1350a, 1350b, and 1350c track the locations of the devices 1310a, 1310b and 1320. Stalker communication devices 1310a and 1310b determine when they are within a predetermined proximity of the target communication device 1320 based, for example, on GPS data. When a stalker communication device 1310 is within the predetermined proximity, an arrival or merge occurs, depending on whether the stalker communication device is first to arrive. For example, if the stalker communication device 1310b is first to arrive, the meeting of the stalker associated with the stalker communication device 1310b and the target is recorded as a merge. Both merges and arrivals are recorded by the stalker's communication device and uploaded to the $talker server via, e.g., the Internet 1330. The $talker server 1340, in turn, facilitates posting of the merge and arrivals on the stalkers' profile pages. If the recorded meeting is a merge, $talker server 1340 facilitates posting of the meeting on the target's pursuit page and allows the target to be rewarded for the merge.

Figure 14:
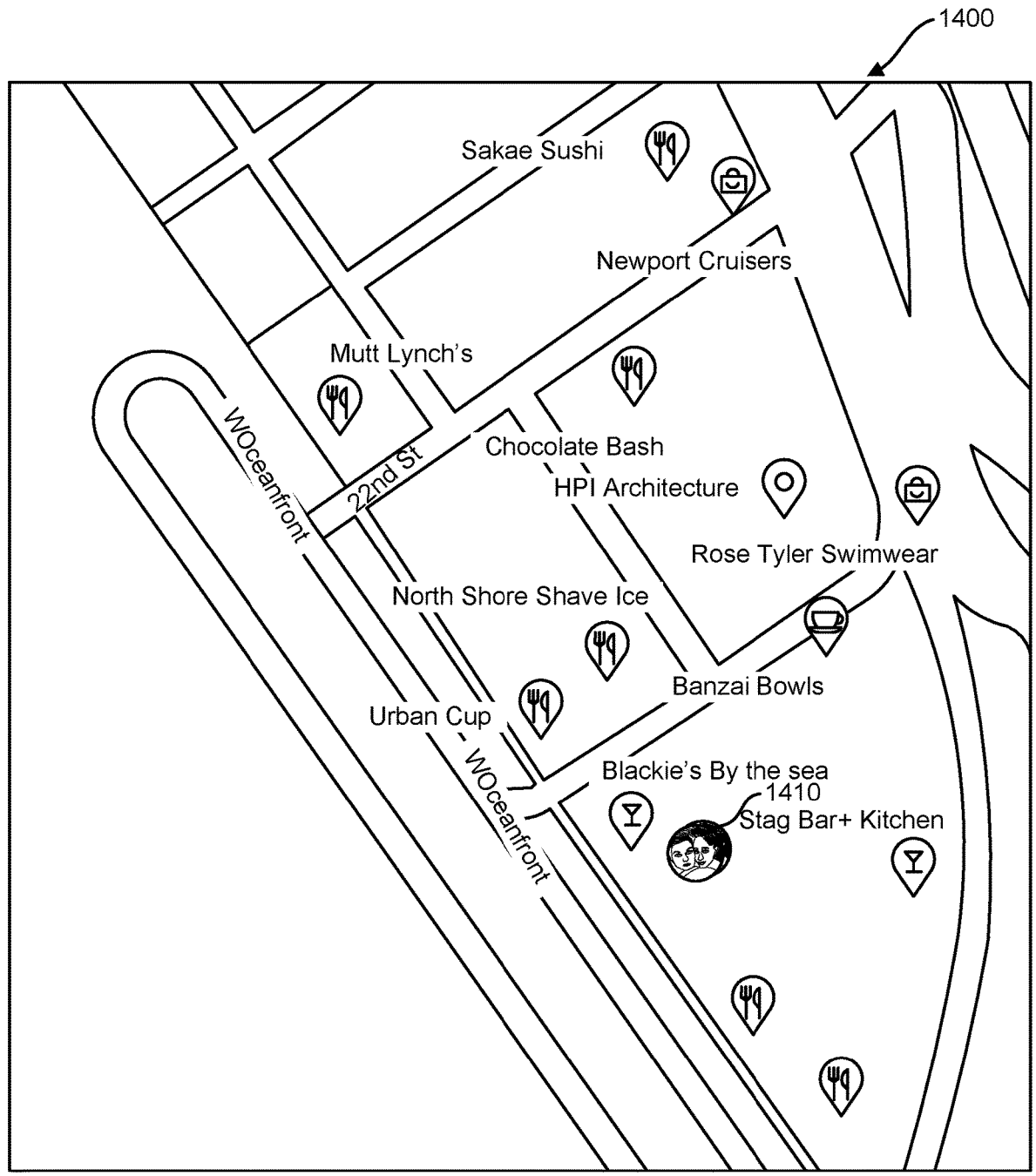
FIG. 14 illustrates a screen showing a geographical overlap of a stalker and a target according to an illustrative embodiment.

According to an illustrative embodiment, dual validation of a merge is provided using the video recording upload of the stalker with a shared or overlapping location of the stalker's device and the target device. This may be understood with reference to FIG. 14 which illustrates a screen 1400 showing the stalker device and the target device in a GPS overlapping shared location 1410. When the stalker gets close enough in proximity to a target, e.g., six feet, the video camera of the stalker's mobile communication device is enabled. Now if there are a thousand stalkers within the predetermined proximity, all of their video cameras would be enabled. Only the first stalker's uploaded recorded meeting that has the same GPS pin point within six feet of the target's mobile communication device would be eligible for a merge, because the stalker is essentially at an arm's distance away from the target and is the first to upload a recorded meeting with a GPS pin point that is substantially identical to the GPS pinpoint as that of the target In this manner, the $talker server 1340 keeps track of the locations of stalker devices 1310a and 1310b and the target device 1320 using location based technology, such as GPS. The GPS pinpoints of the target and stalker are "overlapping" when they are merging. The first to upload this proximity qualifying video wins the merge and therefore the stalker's video is posted on the profile of the target's pursuit page.

It should be appreciated that the location where the stalker meets the target may not be not be the exact location that the target initially posted with an invite. Rather, the meeting location may be within a predetermined distance from the original location of the video invite from the target, e.g., 200 yards. This distance may be adjustable, depending on the circumstances, e.g., depending on whether the target is in a large area, such as a park, arena, or convention center, or in a more confined area, such as a bookstore or restaurant. This distance may be set by the target device 1320 or by the $talker server 1340, based on the location of the target when the target sends an invite. This gives the target the freedom to move around and not be required to sit at a specific location to wait for a merge.

The $talker server 1340 may be a server within a cloud computing network (not shown). It should be appreciated that though only one server 1340 is shown for simplicity of illustration, there may be a plurality of servers. Although details of the $talker server 1340 are not shown, it should be appreciated that the $talker server 1340 may include a transceiver for sending and receiving signals via a communication network, such as the Internet 1330. The server 1340 may also include a processor and a memory containing computer readable instructions that are executable by the processor to cause the processor to perform operations for facilitating and monetizing merges including keeping track of arrivals and merges, validating merges, rewarding targets for merges, initiating posts of recorded merges and arrivals, etc. The memory may also include data indicative of targets that various stalkers are following, pricing of target invites, etc.

Figure 15:
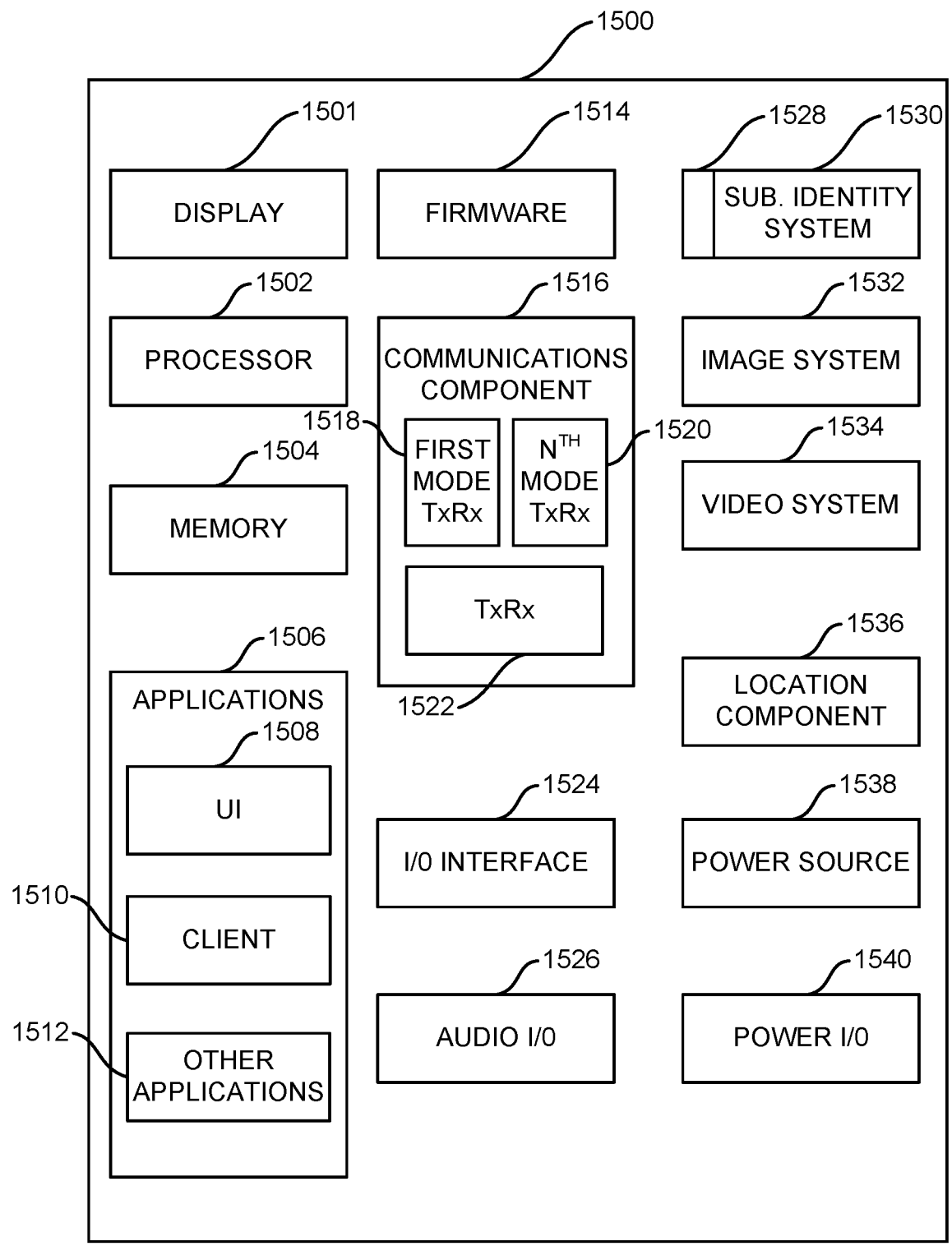
FIG. 15 illustrates a mobile communication device that may be used by stalkers and targets according to illustrative embodiments.

FIG. 15 illustrates an example of a mobile communication device that may be used by targets and/or stalkers. The device 1500 may be a multimode handset and can include a variety of computer-readable media. Although no connections are shown between the components illustrated in FIG. 15, those skilled in the art will appreciate that the components can interact with each other via any suitable connections to carry out device functions.

The device 1500 may include a display 1500, which may be an interactive touchscreen user interface for displaying multimedia and screens such as those shown in FIGS. 1-12. The display may also show other data not related to the $talker application, such as text, images, video, and telephone functions, such as Caller ID data, setup functions, menus, music metadata, messages, wallpaper, graphics, Internet content, device status, preference settings, and the like.

The device 1500 may include a processor 1502 for controlling and/or processing data. A memory 1504 can interface with the processor 1502 for the storage of data and/or applications 1506. Although shown as a separate component, the applications 1506 may be stored in the memory 1504 or in another memory. The applications 1506 may include, for example, $talker application software along with other software usable by mobile communication devices, e.g., SMS messaging software, EMS message software, MMS messaging software, USSD software, a WAP browser, and the like.

In the case of the stalker device, the data stored in the memory may include, for example, data identifying locations and targets, recordings of merges, recordings of arrivals, maps purchased, coupons purchased, a predetermined proximity indicating how close a stalker needs to be to a target for a recording of a meeting to be initiated, etc. In the case of the target device, the data stored in memory may include, for example, invites sent, merges posted, finances earned-to-date, and other applicable analytics, etc.

The applications 1506 may also include a user interface (UI) application 1508. The UI application 1508 can interact with a client 1510 (e.g., an operating system) to facilitate user interaction with the $talker application and with device functionality, for example, viewing received messages, answering/initiating calls, entering/deleting data, password entry and settings, configuring settings, address book and contact list manipulation, and the like. In the case of a stalker device, the UI application 1508 may also interact with the client to facilitate user input regarding the targets, locations, etc. In the case of the target communication device, UI application 1508 may also interact with the client to facilitate user input regarding invites, etc. Such user interaction may be facilitated via, e.g., a keypad or a touchscreen included in the device 1500 as part of the display 1510 or communicating with the device via the I/O interface 1524.

The applications 1506 may include other applications 1512, such as, for example, add-ons, plug-ins, email applications, music application, video applications, camera applications, location-based service (LSB) applications, power conservation applications, game applications, social media applications, productivity application, entertainment applications, combinations thereof, and the like, as well as subsystem and/or components. In the case of the stalker communication device, the other applications 1512 may include an application for determining, based on GPS data of the target device and the stalker device, whether the stalker communication device has come within a predetermined proximity of the target communication device, such that recording is initiated by a camera in the device 1500.

The applications 1506 can be instructions contained on computer-readable media, excluding propagating signals, and may be stored in the memory 1504. The applications may, alternatively, be stored in firmware components 1514. The applications may be executed by the processor 1502. The memory 1504 and/or firmware 1514 can also store code for execution during initialization of the device 1500.

A communications component 1516 may interface with the processor 1502 to facilitate wired/wireless communication. The communications components 1516 also facilitates communication with external systems including, for example, cellular networks, location systems, VoIP networks, local area networks (LAN's), wide area networks (WAN's), metropolitan area networks (MAN's), personal area networks (PAN's), and other networks, which may be implemented using WI-FI, WIMAX, combinations and improvements thereof, and the like. The communications component 1516 can also include a multimode communication subsystem for providing cellular communications via different cellular technologies. For example, a first cellular transceiver 1518 can operate in one mode, for example, a Global System for Mobile communications (GSM) mode, and an Nth transceiver 1520 can operate in a different mode, for example a Universal Mobile Telecommunications Systems (UMTS) mode. While only two transceivers 1518, 1520 are illustrated, it should be appreciated that a plurality of transceivers may be included.

Also, it should be appreciated that the device 1500 may include transceiver for operating in cellular modes other than GSM and UMTS. Such modes may operate according to standards for wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

The communications component 1516 may also include a transceiver 1522 for other communication technologies, such as, for example, WI-FI, WIMAX, BLUETOOTH, infrared, IRDA, NFC, RF, and the like. The communications components 1716 may also facilitate reception from terrestrial radio networks, digital satellite radio networks, Internet based radio service networks, combinations thereof, and the like. The communications component 1716 can process data from a cellular network, a corporate network, a home broadband network, a WI-FI hotspot, and the like via an ISP, DSL provider, or broadband provider. The communications component 1516 can be used to transmit and receive data to and from the $talker server 1540 that facilitates and manages posting of invites, rewarding targets for merges, etc.

An input/output (I/O) interface 1524 may be provided for input/output of data and/or signals. The I/O interface 1524 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 1524 can be used for communication between the device 1500 and a network or local device instead of, or in addition to, the communications component 1516.

Audio capabilities may be provided by an audio I/O component 1526 that may include a speaker for the output of audio signals and a microphone to collect audio signals.

The device 1500 can include a slot interface 1528 for accommodating a subscriber identity system 1530 such as, for example, a subscriber identity module (SIM) or universal SIM (USIM). The subscriber identity system 1530 instead can be manufactured into the device 1500, thereby obviating the need for a slot interface 1528. In some embodiments, the subscriber identity system 1530 can store certain features, user characteristics, rules, policies, models, contact information, and the like. The subscriber identity system 1530 can be programmed by a manufacturer, a retailer, a user, a computer, a network operator, and the like.

The device 1500 can further include an image capture and processing system 1532 (image system). Photos and/or videos can be obtained via an associated image capture subsystem of the image system 1532, for example, a camera. The device 1500 may also include a video system 1534 for capturing, processing, recording, modifying, and or transmitting video content.

A location component 1536 may be included to send and/or receive signals such as, for example, GPS data, A-GPS data, WI-FI/WIMAX and or cellular network triangulation data, combinations thereof, and the like. The location component 1536 can interface with cellular network nodes, telephone lines, location transmitters and/or beacons, wireless network transmitters and receivers, for example, WI-FI hotspots, radio transmitters, combinations thereof and the like.

The device 1500 may also include a power source 1538, such as batteries and/or other power subsystems (AC or DC). The power source 1538 can interface with an illustrative power system or charging equipment via a power I/O component 1540.

Figure 16A:
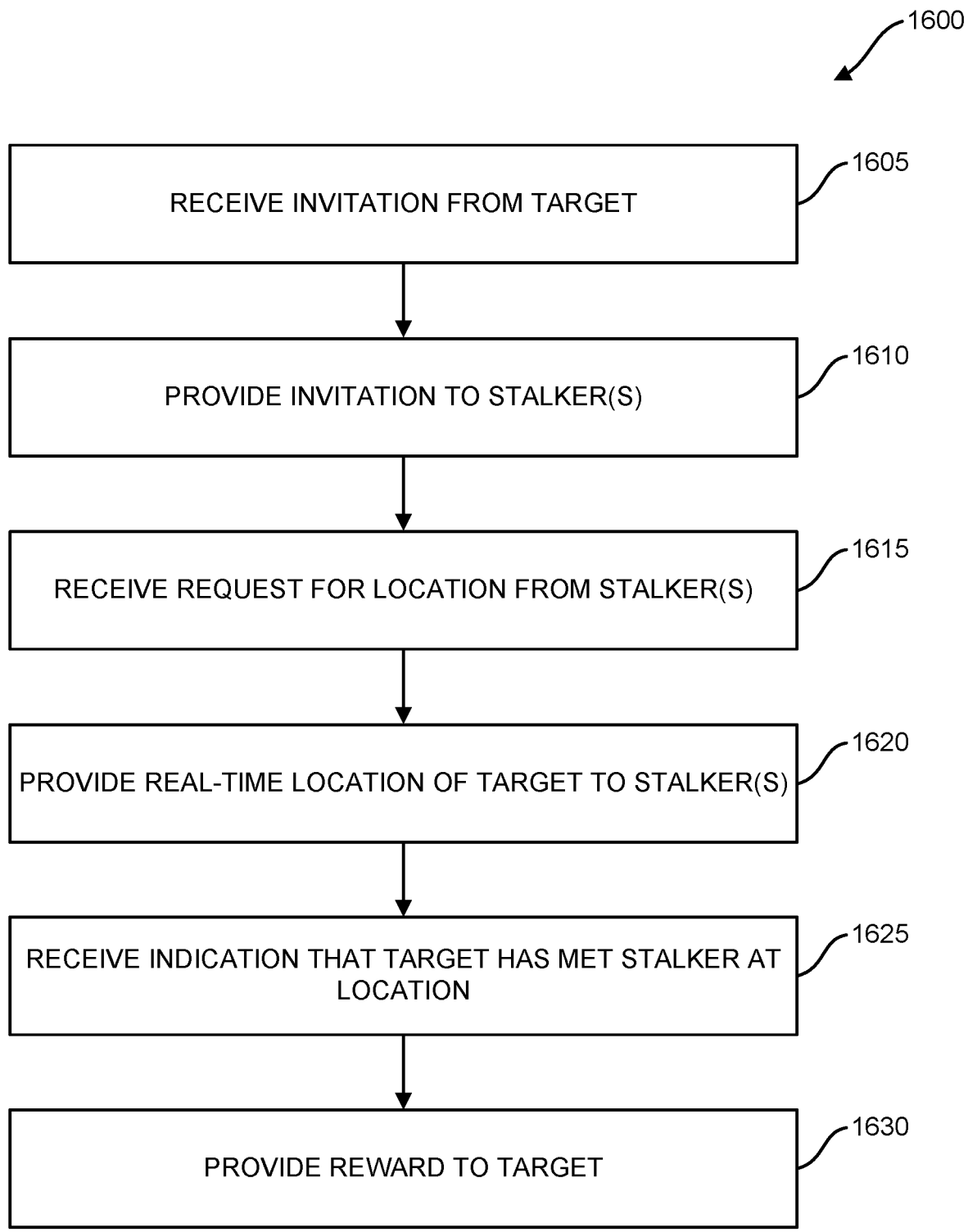
FIGS. 16A and 16B illustrate methods for facilitating and monetizing the merges of targets and stalkers according to illustrative embodiments.
Figure 16B:
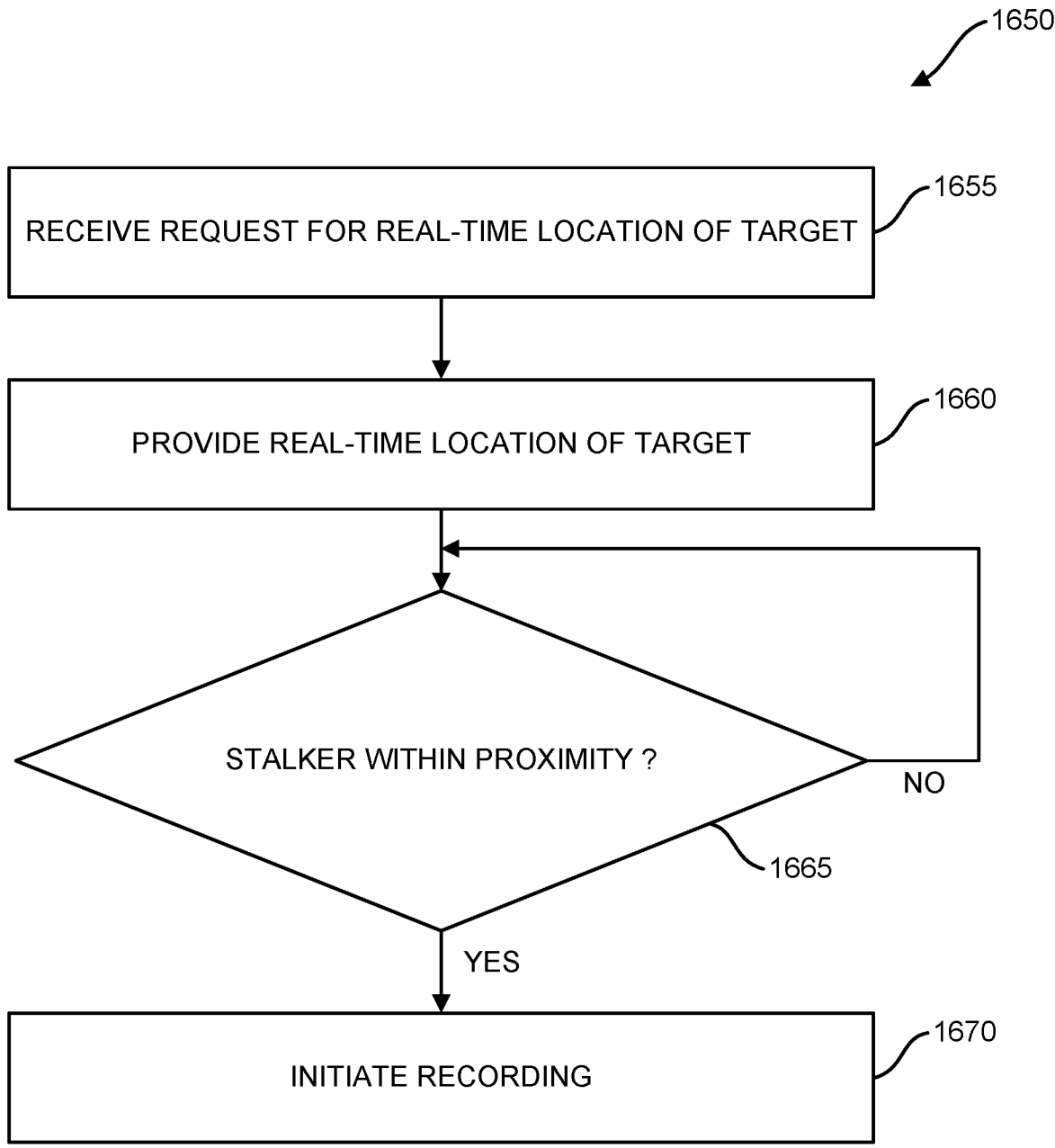

FIGS. 16A and 16B illustrate methods for facilitating and monetizing the merges of targets and stalkers according to illustrative embodiments. It should be appreciated that the steps and order of steps described and illustrated are provided as examples. Fewer, additional, or alternative steps may also be involved and/or some steps may occur in a different order.

Referring to FIG. 16A, a method 1600 performed by a server, e.g., the server 1340 shown in FIG. 13, is illustrated. The method beings at step 1605 at which an invitation is received from a mobile communication device associated with a target, e.g., the target device 1320. This invitation may include a location of the target.

At step 1610, the invitation is provided to one or more mobile communication devices associated with one or more stalkers, e.g., the stalker devices 1310a and 1310b. At step 1615, a request for the location of the target is received from one or more mobile communication devices associated with one or more stalkers, e.g., the stalker device 1310a. At step 1620, the real-time location of the target is provided to the mobile communication device associated with the stalker who requested the location.

At step 1625, an indication is received that the target has met the stalker at the location. This indication may be in form of a recorded meeting between the stalker and the target at the location. At step 1630, a reward is provided to the target.

Referring to FIG. 16B, a method 1650 performed by a mobile communication device associated with a stalker, e.g., a mobile communication device 1310a shown in FIG. 13, is illustrated. The method begins at step 1655 at which a request for the real time-time location of a target is received. At step 1660, the real-time location of the target is provided.

At step 1665, a determination is made whether the stalker is within a predetermined proximity of the target, e.g., by determining whether a mobile communication device associated with a stalker is within a predetermined proximity of a mobile communication device associated with the target. This step is repeated until the stalker is within the predetermined proximity. Once a stalker is within a predetermined proximity of the target, the method proceeds to step 1670, at which recording is initiated to record a meeting of the stalker with the target.

While the various embodiments have been shown and described in example forms with regard to a stalker devices, target devices and a stalker server, it should be appreciated that methods may be carried out by such devices for facilitating and monetizing merges using various elements described above. Further, it will be apparent to those skilled in the art that many modifications, additions, and deletions can be made therein without departing from the spirit and scope of the invention as defined by the following claims.

What is claimed is:

1. A method, comprising:
  receiving, from a mobile communication device associated with an entity of interest, an invitation to meet with users, the invitation including a real-time location of the entity of interest;
  providing the invitation to at least one mobile communication device associated with a user;
  receiving, from the at least one mobile communication device associated with the user, a request for the real-time location of the entity of interest;
  responsive to the request for the location, providing the real-time location of the entity of interest to the at least one mobile communication device;
  receiving, from the at least one mobile communication device, an indication that the user of the at least one mobile communication device has met the entity of interest at the location; and
  providing a reward to the entity of interest responsive to receipt of the indication that the user of the at least one mobile communication device has met the entity of interest.

2. The method of claim 1, wherein the indication that the user of the mobile communication device has met the entity of interest at the location includes a recording of a meeting between the user of the mobile communication device and the entity of interest.

3. The method of claim 2, wherein the recording is a video recording.

4. The method of claim 3, further comprising initiating posting of the recorded meeting on a web page associated with the user of the at least one mobile communication device.

5. The method of claim 2, wherein the recording is automatically initiated by the at least one mobile communication device upon arrival within a predetermined proximity of the location of the entity of interest.

6. The method of claim 5, wherein requests are received from a plurality of mobile communication devices associated with different users, the real-time location of the entity of interest is provided to the plurality of mobile communication devices, and the recorded meeting of the first user to arrive within the predetermined proximity of the location of the entity of interest is posted on a web page associated with the entity of interest.

* * * * *